(12) United States Patent
Mizoguchi

(10) Patent No.: US 7,983,111 B2
(45) Date of Patent: Jul. 19, 2011

(54) MEMORY CONTROLLER FOR CONTROLLING MEMORY AND METHOD OF CONTROLLING MEMORY

(75) Inventor: Masahiko Mizoguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 829 days.

(21) Appl. No.: 12/069,534

(22) Filed: Feb. 11, 2008

(65) Prior Publication Data

US 2008/0201521 A1 Aug. 21, 2008

(30) Foreign Application Priority Data

Feb. 21, 2007 (JP) ................................ 2007-040788

(51) Int. Cl.
*G11C 8/00* (2006.01)
(52) U.S. Cl. ................. 365/233.1; 365/230.09; 365/239
(58) Field of Classification Search ............ 365/230.09, 365/239
See application file for complete search history.

(56) References Cited

U.S. PATENT DOCUMENTS

| | | | |
|---|---|---|---|
| 5,343,425 A | 8/1994 | Saito et al. | |
| 5,652,856 A * | 7/1997 | Santeler et al. | 711/105 |
| 6,397,312 B1 * | 5/2002 | Nakano et al. | 711/167 |
| 6,490,225 B1 * | 12/2002 | Millar et al. | 365/193 |
| 6,633,965 B2 * | 10/2003 | Rentschler et al. | 711/167 |
| 6,965,530 B2 | 11/2005 | Shimbayashi | |
| 7,254,090 B2 * | 8/2007 | Hara et al. | 365/239 |
| 2004/0054852 A1 | 3/2004 | Nain et al. | |
| 2005/0283598 A1 | 12/2005 | Gaskins et al. | |

FOREIGN PATENT DOCUMENTS

| | | |
|---|---|---|
| JP | 5-274864 | 10/1993 |
| JP | 6-274410 | 9/1994 |
| JP | 11-273370 | 10/1999 |
| JP | 2000-285685 | 10/2000 |
| JP | 2003-051194 | 2/2003 |
| JP | 2003-068100 | 3/2003 |
| JP | 2004-206832 | 7/2004 |
| JP | 2006-155303 | 6/2006 |

* cited by examiner

*Primary Examiner* — Tan T. Nguyen
(74) *Attorney, Agent, or Firm* — Nutter McClennen & Fish LLP; John J. Penny, Jr.

(57) ABSTRACT

A memory controller for controlling a memory that operates in synchronization with a clock signal, wherein the memory sequentially outputs data of addresses starting from a target address in synchronization with the clock signal after receiving a read command and the target address, the memory controller includes a supply control module that performs a supply process for supplying data inside the memory corresponding to a request address to an external device, in response to a read request designating the request address which is transmitted from the external device, wherein the supply process includes a supply process using a sequential mode, and wherein the supply process using the sequential mode includes a process for acquiring data to be supplied to the external device from the memory in response to read requests by repeatedly stopping and restarting supply of the clock signal without supplying the read command and the target address to the memory, in a case where a plurality of consecutive request addresses are sequentially designated one after another by a plurality of the consecutive read requests and a process for supplying requested data from among data acquired in response to the plurality of the read requests to the external device.

13 Claims, 15 Drawing Sheets

OPERATION OF SERIAL FLASH MEMORY

FIG. 9

| ADDRESS | MODE |
|---|---|
| 000000h<br>\|<br>00FFFFh | SEQUENTIAL |
| 010000h<br>\|<br>FFFFFFh | RANDOM |

(DATA EXAMPLE)

↓

PROGRAM

LUT

MEMORY CONTROLLER FOR CONTROLLING MEMORY AND METHOD OF CONTROLLING MEMORY

BACKGROUND

1. Technical Field

The present invention relates to a memory controller that controls a memory and a method of controlling a memory.

2. Related Art

Memories for storing data are used in various fields of technology. In order to use data stored in the memories in a speedy manner, various researches have been performed. For example, technology for substantially removing a transfer delay time of a signal path relating to a serial-to-parallel conversion of data stored in a flash memory or the like by using a plurality of flash memories connected in parallel has been proposed. The technology has been disclosed, for example, in JP-A-2000-285685 and JP-A-2006-155303.

Recently, memories operate in synchronization with clock signals are widely used. Among the memories, there is a type of memories in which data of a target address is output after a read command and the target address are received (for example, a serial flash memory). However, sufficient researches have not been made for using the data stored in the memories in a speedy manner.

SUMMARY

An advantage of some aspects of the invention is that it provides technology for using data stored in a memory in a speedy manner.

According to a first aspect of the invention, there is provided a memory controller for controlling a memory that operates in synchronization with a clock signal, wherein the memory sequentially outputs data of addresses starting from a target address in synchronization with the clock signal after receiving a read command and the target address. The memory controller includes a supply control module that performs a supply process for supplying data inside the memory corresponding to a request address to an external device, in response to a read request designating the request address which is transmitted from the external device, wherein the supply process includes a supply process using a sequential mode. The supply process using the sequential mode includes: a process for acquiring data to be supplied to the external device from the memory in response to read requests by repeatedly stopping and restarting supply of the clock signal without supplying the read command and the target address to the memory, in a case where a plurality of consecutive request addresses are sequentially designated one after another by a plurality of the consecutive read requests; and a process for supplying requested data from among data acquired in response to the plurality of the read requests to the external device.

According to this memory controller, since data of a plurality of consecutive addresses is acquired from the memory by repeatedly stopping and restarting the supply of the clock signal without supplying the read command and the target address to the memory and requested data of acquired data is supplied to the external device in response to the read request, data stored in the memory can be used in a speedy manner.

The memory controller may further include a buffer for temporarily storing the data acquired from the memory, and the supply process using the sequential mode may further include: a process for acquiring data from the memory by restarting the supply of the clock signal and storing the acquired data in the buffer before the read request requesting for the acquired data is received; and a process for supplying the acquired data from the buffer to the external device in response to a read request requesting for the acquired data.

Under this configuration, since data is stored in the buffer before the read request is received, the data stored in the memory can be used in a speedier manner.

The supply process using the sequential mode may further include: a process for acquiring data corresponding to predetermined N (where N is an integer equal to or larger than one) consecutive addresses starting from a request address designated by a first read request from the memory, storing the acquired data in the buffer, and stopping the supply of the clock signal in response to the first read request in the supply process using the sequential mode; and a process for restarting the supply of the clock signal in response to achievement of a predetermined condition including reception of predetermined M (M is an integer equal to or larger than one and equal to or smaller than N) read requests.

Under this configuration, the supply process using the sequential mode by using the buffer can be appropriately started.

The supply process may further include a supply process using a random mode, and the supply process using the random mode may include: a process for supplying the read command to the memory and stopping the supply of the clock signal to the memory, before reception of a read request next to the read request after data requested by the received read request is acquired from the memory; and a process for restarting the supply of the clock signal, supplying a target address corresponding to a request address designated by the next read request, acquiring data requested by the next read request from the memory, and supplying the acquired data to the external device, in response to the reception of the next read request.

Under this configuration, after data requested by the read request is acquired from the memory, operations for supply of the read command and supply of the clock signal are performed before the next read request is received. Then, in response to reception of the next read request, the supply of the clock signal is restarted, the target address is supplied to the memory, data corresponding to the next read request is acquired from the memory, and the acquired data is supplied to the external device, and accordingly, the data stored in the memory can be used in a speedy manner.

The supply control module may perform a process including a selection process using a first selection mode as a selection process for selecting a mode for performing the supply process between the sequential mode and the random mode. The selection process using the first selection mode may include: a process for selecting the sequential mode on the basis of reception of a direction for which the sequential mode is to be used from the external device; and a process for selecting the random mode on the basis of reception of a direction for which the random mode is to be used from the external device.

Under this configuration, the mode of the supply process can be appropriately selected in accordance with a direction from the external device.

The supply control module may perform a process including a selection process using a second selection mode as a selection process as a selection process for selecting a mode for performing the supply process between the sequential mode and the random mode. The selection process using the second selection mode may include: a process for selecting the sequential mode in a case where the request address is within a predetermined range; and a process for selecting the random mode in a case where the request address is beyond the predetermined range.

Under this configuration, the mode of the supply process can be appropriately selected on the basis of the request address.

The external device may include a calculation unit, wherein the calculation unit includes: an execution module for executing a process in accordance with a program code; and a prefetch module for acquiring the program code from the memory through the memory controller before execution is performed by the execution module. In such a case, the prefetch module includes a determination module that determines whether a prefetch address that is a request address corresponding to a program code to be newly acquired is to be set to an address next to the request address corresponding to a last acquired program code, wherein the supply control module performs a process including a selection process using a third selection mode as a selection process for selecting a mode for performing the supply process between the sequential mode and the random mode. The selection process using the third selection mode includes: a process for acquiring a result of the determination from the determination module; a process for selecting the sequential mode in a case where the result of the determination indicates that the prefetch address is set to be the next address; and a process for selecting the random mode in a case where the result of the determination indicates that the prefetch address is not set to be the next address.

Under this configuration, the mode of the supply process can be appropriately selected on the basis of the result of determination of the determination module.

The memory may perform a process from the start of one read command to the end of the read command while a given chip select signal is maintained to be in an active state, and the supply process using the random mode may further include a process for maintaining the chip select signal to be in an active state from the start of supply of the read command to the memory before reception of the next read request to completion of acquisition of data requested by the next read request from the memory.

Under this configuration, in the supply process using the random mode, data can be appropriately acquired from the memory.

The memory may be able to receive a new read command in response to shift of the chip select signal from an inactive state to an active state, and the supply process using the random mode may further include a process for setting the chip select signal to be in an inactive state before supply of the read command to the memory which is performed before reception of the next read request and continuously setting the chip select signal to be in an active state.

Under this configuration, in the supply process using the random mode, the read command can be appropriately supplied to the memory.

The memory may perform a process from the start of one read command to the end of the read command while a given chip select signal is maintained to be in an active state. In such a case, the supply process using the sequential mode further includes a process that maintains the chip select signal to be in an active state while operations for stopping and restarting of the supply of the clock signal are repeatedly performed.

Under this configuration, in the supply process using the sequential mode, data can be appropriately acquired from the memory.

The supply process using the sequential mode may further include a process for performing a non-consecutive responding process in response to reception of a non-consecutive read request designating a non-consecutive request address, wherein the non-consecutive responding process includes: a process for acquiring non-consecutive address data that is data corresponding to the non-consecutive read request from the memory by supplying the clock signal, the read command, and a target address corresponding to a request address designated by the non-consecutive read request to the memory; and a process for supplying the acquired non-consecutive address data to the external device.

Under this configuration, in the supply process using the sequential mode, appropriate data can be supplied even in a case where a non-consecutive address is designated by the read request.

The present invention can be implemented in various forms. For example, the invention may be implemented in a form such as a method of controlling a memory, a memory controller for controlling a memory, a memory module including the memory controller and a memory, a computer program for implementing the functions of the method or the apparatus, a recording medium in which the computer program is recorded, or a data signal that includes the computer program and is realized in a carrier wave.

BRIEF DESCRIPTION OF THE DRAWINGS

The invention will be described with reference to the accompanying drawings, wherein like numbers reference like elements.

FIG. 9 is a schematic diagram showing an example of a sequential range according to an embodiment of the invention.

DESCRIPTION OF EXEMPLARY EMBODIMENTS

Hereinafter, embodiments of the present invention will be described on the basis of examples in the following order.
A. First Embodiment
B. Second Embodiment
C. Third Embodiment
D. Fourth Embodiment
E. Modified Examples

A. First Embodiment

Figure 1:
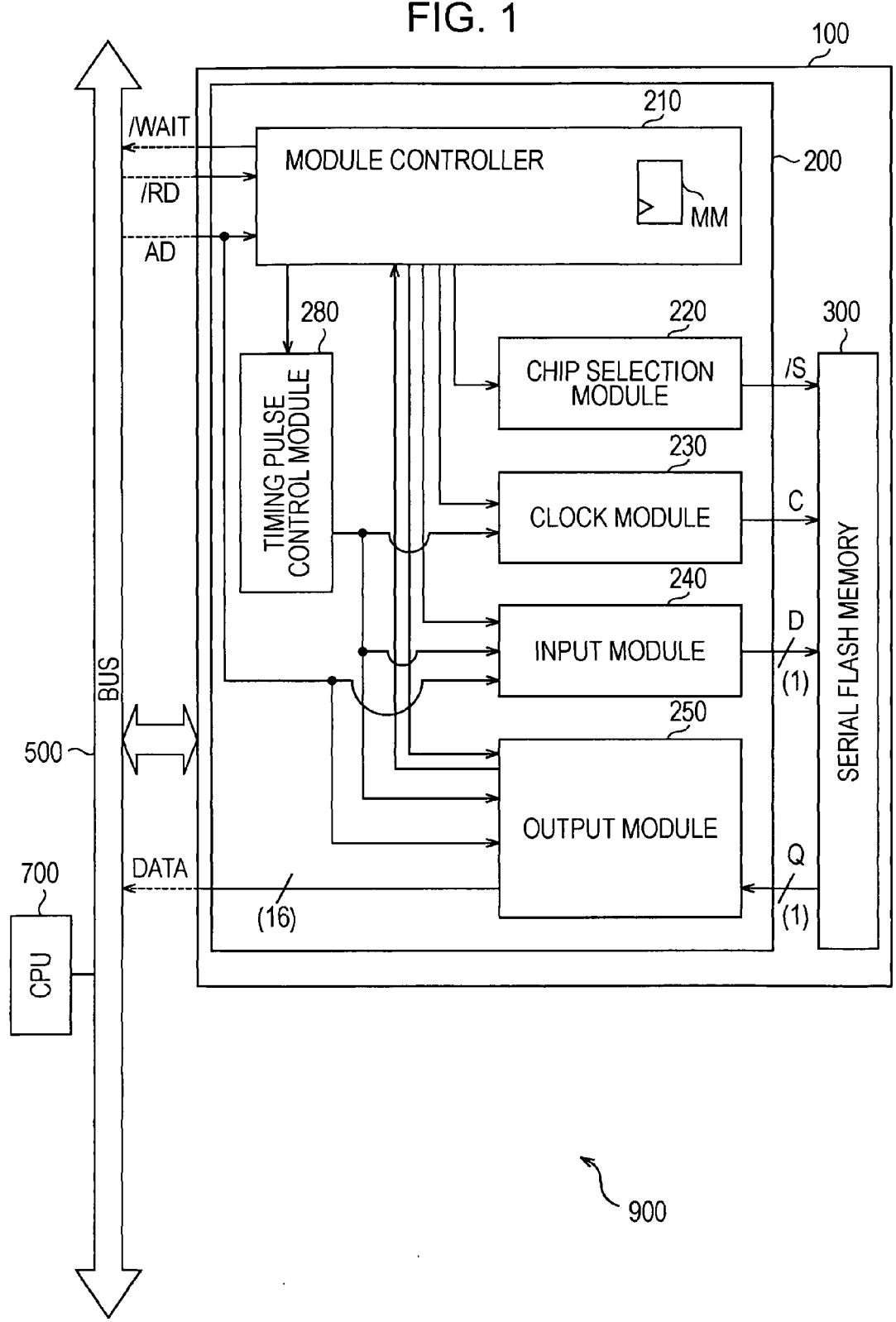
FIG. 1 is a schematic diagram showing a data processing apparatus according to an embodiment of the invention.

FIG. 1 is a schematic diagram showing a data processing apparatus according to an embodiment of the invention. The data processing apparatus 900 includes a bus 500, a central processing unit 700 (hereinafter referred to as a CPU 700) connected to the bus 500, and a memory module 100 connected to the bus 500. The memory module 100 has a memory controller 200 and a serial flash memory 300 (hereinafter, also referred to as a serial memory 300). The CPU 700 transmits a read request to the memory module 100 through the bus 500. The memory controller 200 supplies data of an address (hereinafter, referred to as a requested address) designated by the read request to the CPU 700 through the bus 500 in response to the read request. The memory controller 200 reads out data to be supplied from the serial memory 300.

Various signals including a read request signal /RD and an address signal AD are transmitted from the bus 500 to the memory controller 200. These signals /RD and AD are transmitted on the basis of commands of the CPU 700. Various signals including a wait signal /WAIT and a data signal DATA are transmitted from the memory controller 200 to the bus 500. These signals /WAIT and DATA are supplied to the CPU 700 through the bus 500. In this embodiment, the read request signal /RD is represented in one signal line (1 bit), the address signal AD is represented in 24 signal lines (24 bits), the wait signal /WAIT is represented in one signal line (1 bit), and the data signal DATA is represented in 16 signal lines (16 bits). However, the number of bits for each signal may be arbitrarily set. A leading mark "/" of a code representing a signal indicates a signal having negative logic. This also applies for other signals to be described later.

From the memory controller 200, various signals including a chip select signal /S, a clock signal C, and an input data signal D are transmitted to the serial memory 300. The serial memory 300 operates in synchronization with this clock signal C. From the serial memory 300, various signals including an output data signal Q are transmitted to the memory controller 200. In this embodiment, each signal /S, C, D, or Q is represented in one signal line (1 bit). However, the number of bits of each signal may be arbitrarily set.

The memory controller 200 has a module controller 210, a chip select module 220, a clock module 230, an input module 240, an output module 250, and a timing pulse control module 280. Each component of the memory controller 200 is constituted by an electronic circuit that implements the function of the component. As the electronic circuit, for example, a dedicated electronic circuit such as an ASIC (Application Specific Integrated Circuit) may be employed.

The chip select module 220 controls the chip select signal /S. The clock module 230 controls the clock signal C. The input module 240 controls the input data signal D. The output module 250 receives the output data signal Q and supplies the received data to the bus 500 as the data signal DATA. The timing pulse control module 280 controls a clock signal for operating the modules 220, 230, 240, and 250.

The module controller 210 controls the overall operation of the memory controller 200 by controlling the operation of each module of the memory controller 200. The signals /WAIT, DATA, /S, C, and D output from the memory controller 200 are directly or indirectly controlled by the module controller 210. In particular, the module controller 210 directly controls the wait signal /WAIT. The chip select module 220, the clock module 230, and the input module 240 control the signals /S, C, and D on the basis of directions of the module controller 210. The output module 250 performs an operation for reception of the output data signal Q and an operation for control of the data signal DATA on the basis of directions of the module controller 210. In other words, the signals /S, C, D, and DATA output from the memory controller 200 are indirectly controlled by the module controller 210. In descriptions below, a representation that "the module controller 210 controls the signals /S, C, D, and DATA" will be used even for a case where an indirect control operation is performed.

The module controller 210 performs a supply process by controlling the operation of each module of the memory controller 200. The supply process is a process for supplying data corresponding to an address inside the serial memory 300 to the CPU 700 in response to a read request designating the address which is transmitted from the CPU 700. As described above, the module controller 210 corresponds to a supply control module according to the invention. The module controller 210 can perform a supply process using a sequential mode and a supply process using a random mode. The module controller 210 has a mode memory MM for storing information on the mode of the supply process.

Figure 2:
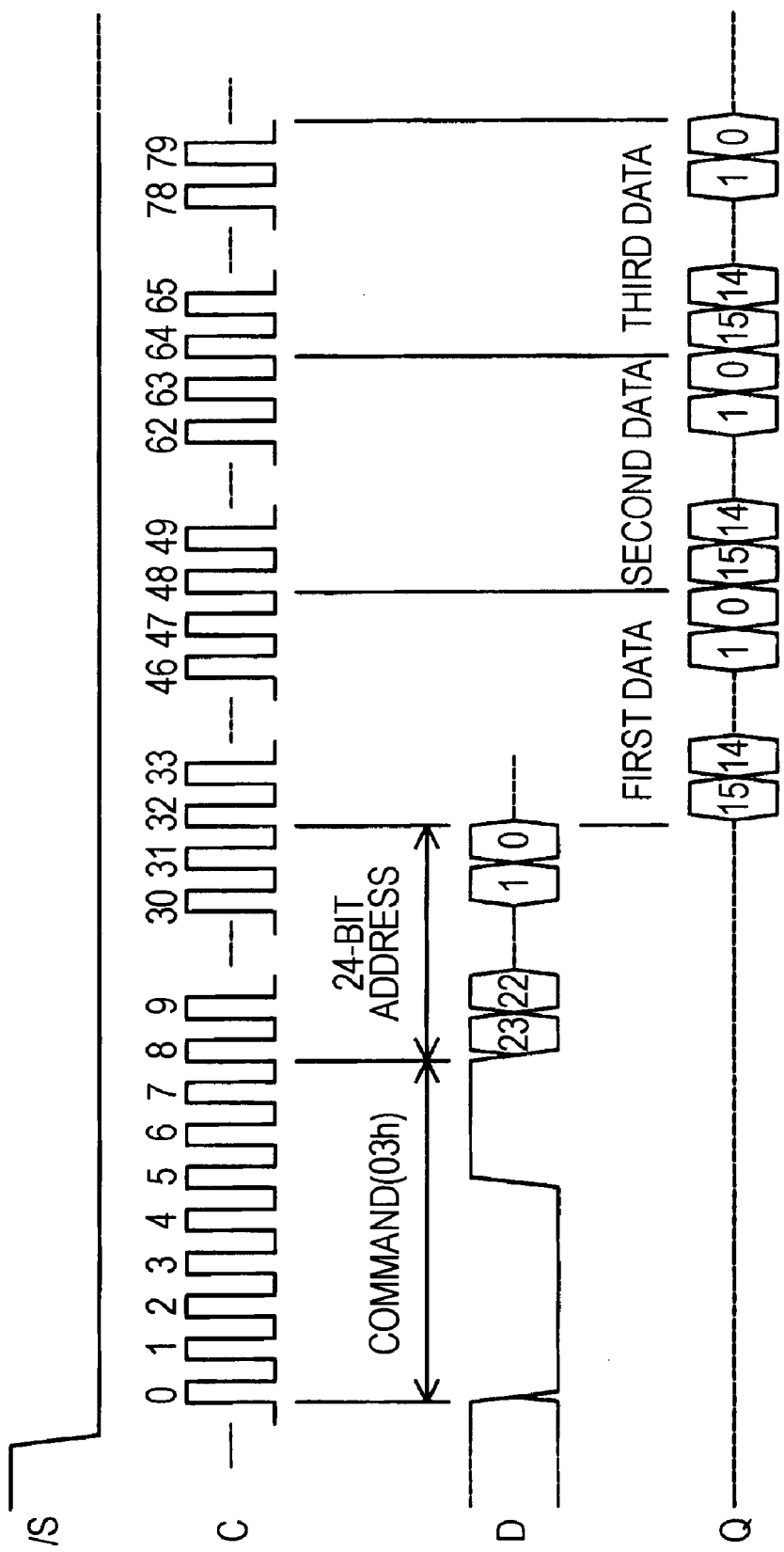
FIG. 2 is a timing chart showing the operation of a serial memory according to an embodiment of the invention.

FIG. 2 is a timing chart showing the operation of the serial memory 300 according to an embodiment of the invention. The timing chart represents a basic read operation. First, a chip select signal /S is asserted. Here, "to assert a signal" means that the signal is shifted to an active state. Generally, a positive-logic signal is shifted to level H from level L by being asserted, and a negative-logic signal is shifted to level L from level H by being asserted. "To negate a signal" means that the signal is shifted to an inactive state, to the contrary to a case where a signal is asserted. In this embodiment, the chip select signal /S is shifted to level L from level H by being asserted.

After the chip select signal /S is asserted, a read command and an address are input by using the input data signal D. In the example shown in FIG. 2, the read command is represented in 8 bits, and the value thereof is "03h" (h denotes a hexadecimal number). The address is represented in 24 bits. First, the read command is input, one bit at a time, and subsequently, the address is input, one bit at a time. The data is input in synchronization with the clock signal C. This address corresponds to a target address according to the invention.

After the input of the address is completed, data is output by using the output data signal Q. First, data (first data) of the above-described target address is output. In the example shown in FIG. 2, the data corresponding to one address is represented in 16 bits. The 16-bit data is output in synchronization with the clock signal C, one bit at a time. After the first data is output, second data is output. The second data is data of an address next to the address of the first data. After the second data is output, third data is output. The third data is data of an address next to the address of the second data. As described above, the serial memory 300 sequentially outputs data while increasing the address by one at a time in synchronization with the clock signal C.

The read command is completed by negating the chip select signal /S (not shown). In this embodiment, the completion of the read command performed by negating the chip select signal /S can be performed at an arbitrary timing.

In order to execute a new read command, the above-described sequence started by asserting the chip select signal /S is repeated. Since the target address can be arbitrarily set, data of an arbitrary address can be read out.

Figure 3:
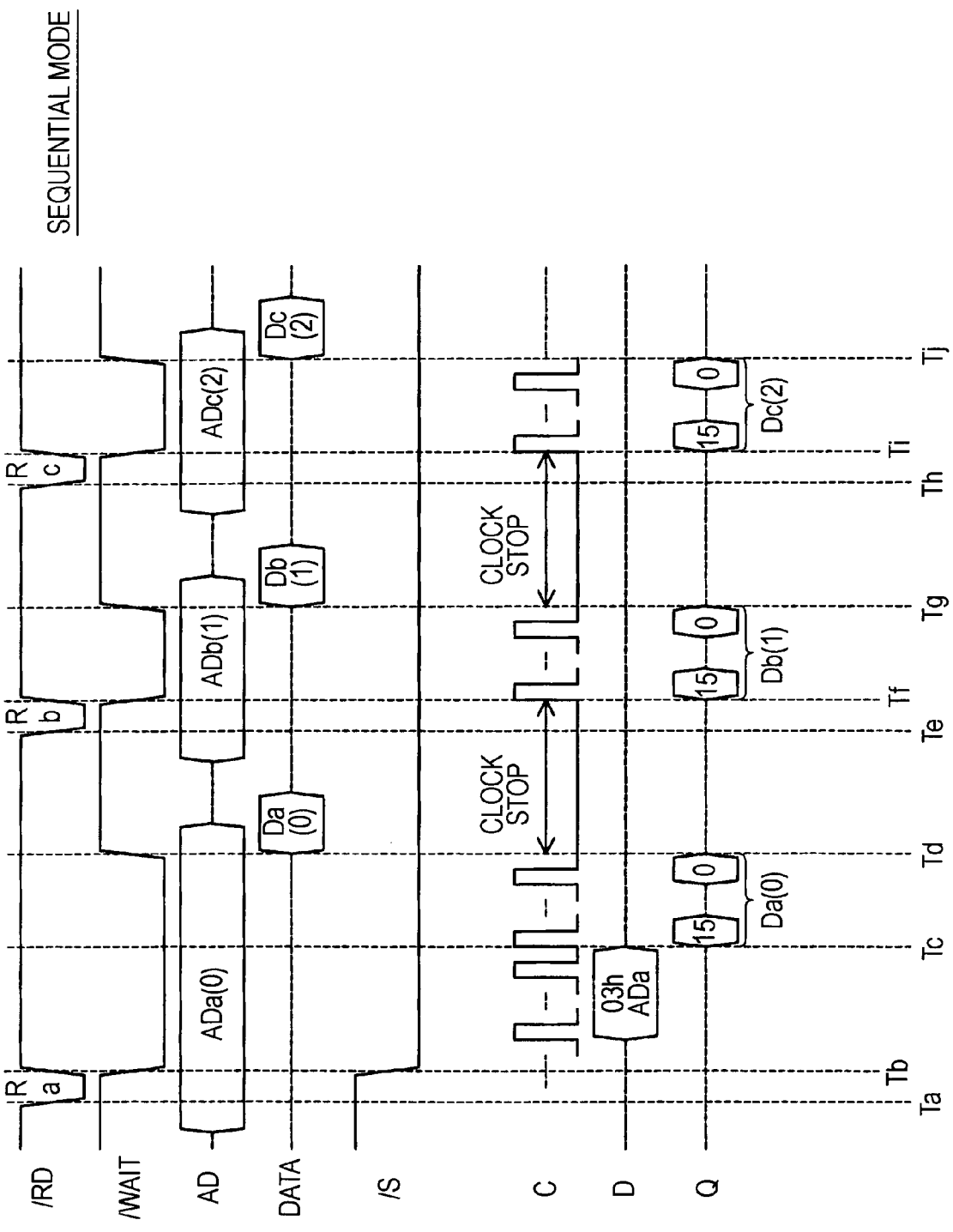
FIG. 3 is a timing chart showing a supply process using a sequential mode according to an embodiment of the invention.

FIG. 3 is a timing chart showing a supply process using a sequential mode according to an embodiment of the invention. This timing chart represents timings of transmission and reception operations performed by the memory controller 200. In this timing chart, signals /RD, /WAIT, AD, DATA, /S, C, D, and Q are shown. In this example, three read requests Ra, Rb, and Rc are sequentially received by the memory controller 200 in the mentioned order. As will be described later, in the read requests Ra, Rb, and Rc, the address is incremented by one.

First, the CPU 700 (FIG. 1) transmits a first read request Ra to the memory controller 200 through the bus 500. In particular, the CPU 700 asserts a read request signal /RD (at timing Ta). At this moment, the CPU 700 designates an address by using an address signal AD (first address ADa). This address corresponds to a request address according to the invention.

Numbers inside parentheses attached to codes representing addresses indicate relative addresses with respect to other addresses in the same timing chart. For example, a third address ADc(2) represents an address resulted from adding two to the first address ADa(0). In this timing chart, same numbers are attached to codes (Da, Db, and Dc) representing data. The numbers are used in the same manner for other timing charts to be described later.

The module controller 210 asserts the wait signal /WAIT and the chip select signal /S in response to the first read request Ra (at timing Tb). The CPU 700 stops progress of the process in accordance with assertion of the wait signal /WAIT.

Next, the module controller 210 supplies a read command (03h) and an address (ADa) to the serial memory 300 by using an input data signal D (at timings Tb to Tc). The address supplied to the serial memory 300 is the same as the request address designated by the CPU 700.

After the supply of the address is completed, the serial memory 300 outputs first data Da of the first address ADa one bit by one bit by using an output data signal Q (at timings Tc to Td).

In response to completion of output of the first data Da, the module controller 210 negates the wait signal /WAIT and supplies the first data Da to the CPU 700 by using the data signal DATA (at timing Td). The CPU 700 acquires the first data Da represented by the data signal DATA in response to negation of the wait signal /WAIT.

The module controller 210 stops supply of the clock signal C in response to completion of output of the first data Da (at timing Td). The chip select signal /S is not negated and maintained to be asserted. As a result, the operation of the serial memory 300 is stopped in a state that data of the next address can be output.

Then, the CPU 700 transmits a second read request Rb that is a next read request to the memory controller 200 at an arbitrary timing (at timing Te). In the example shown in FIG. 3, the second address ADb designated by the second read request Rb is an address next to the first address ADa. As described above, it is frequently performed to read data of an address next to the address used in the previous read. For example, it is performed to read data of the next address in a case where a program code is read from the memory or large-size data such as image data is read from the memory.

In response to the second read request Rb, the module controller 210 asserts the wait signal /WAIT and restarts supply of the clock signal C (at timing Tf). The serial memory 300 outputs the second data Db of the next address (ADb) one bit by one bit in response to the supply of the clock signal C (at timings Tf to Tg).

The process for responding to the completion of output of the second data Db is the same as that of the first data Da. As a result, the CPU 700 acquires the second data Db represented by the data signal DATA, and the operation of the serial memory 300 is stopped in a state that data of the next address can be output.

Then, the module controller 210 repeats restarting and stopping supply of the clock signal C without supplying a read command and an address to the serial memory 300. In the example shown in FIG. 3, like the second data Db corresponding to the second read request Rb, a third data Dc corresponding to a third read request Rc that is the next data is supplied. As described above, in the sequential mode, a read command and an address are not supplied to the serial memory 300 after the read command and the address are supplied to the serial memory 300 for the first time. In the example shown in FIG. 3, the first read request Ra is the first read request in the sequential mode.

Figure 4:
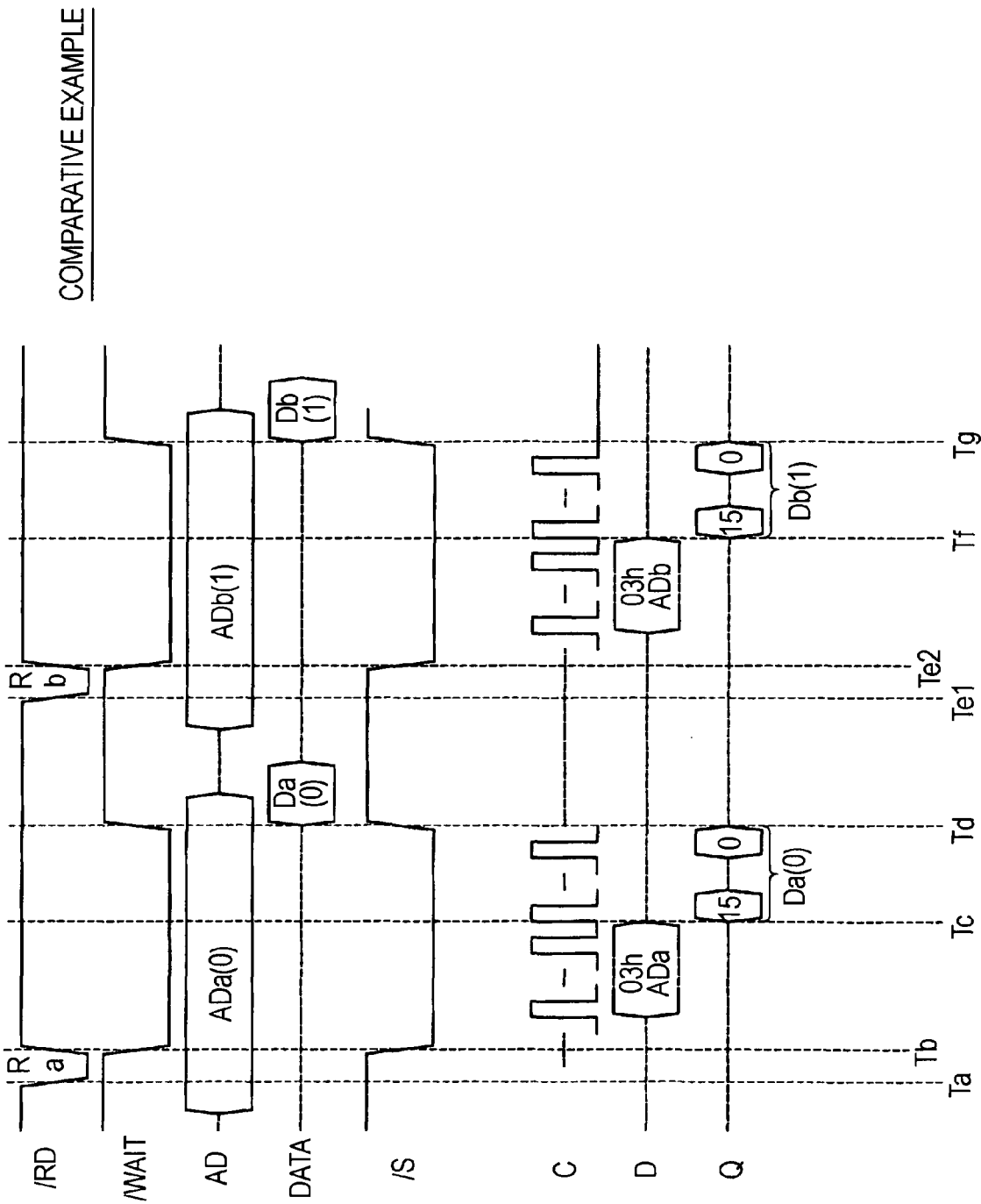
FIG. 4 is a timing chart showing a comparative example of the supply process.

FIG. 4 is a timing chart showing a comparative example of a supply process. In this comparative example, the module controller 210 supplies a read command and an address to the serial memory 300 each time a read request designating an address is received for responding to an arbitrary address.

The process from reception of the first read request Ra performed by the memory controller 200 to completion of output of the first data Da performed by the serial memory 300 is the same as that of the sequential mode shown in FIG. 3 (at timings Ta to Td).

Next, the module controller 210 negates the wait signal /WAIT in response to the completion of output of the first data Da. Then, the module controller supplies the first data Da to the CPU 700 by using the data signal DATA (at timing Td). Then, the module controller 210 completes the read command by negating the chip select signal /S.

In a case where the second read request Rb that is the next request is received, the module controller 210 performs the supply process in the same way as in a case where the first read request Ra is received. In other words, a read command (03h) and an address (ADb) are supplied to the serial memory 300, and data output from the serial memory 300 is supplied to the CPU 700.

In this comparative example, the module controller 210 supplies a read command (03h) and an address to the serial memory 300 each time when a read request designating the address is received. On the other hand, in the sequential mode shown in FIG. 3, the module controller 210 acquires data of a request address from the serial memory 300 by controlling the clock signal C without supplying the read command and the address to the serial memory 300. As a result, in the sequential mode, a time from reception of a read request to supply of requested address data to the CPU 700 is shortened. Accordingly, data stored in the serial memory 300 can be used in a speedy manner.

In particular, in the sequential mode shown in FIG. 3, a 32-clock time for a read command (8 bits) and an address (24 bits) is shortened for one read request. For a read request from the second read request and thereafter, a waiting time for one read request is 16 clocks (for example, timings Tf to Tg). On the other hand, in the comparative example shown in FIG. 4, the waiting time for one read request is at least 48 clocks (for example, timings Te2 to Tg). As described above, in the sequential mode, the waiting time can be markedly shortened. Data to be sequentially read from a plurality of consecutive addresses one after another is appropriate for the sequential mode. In the comparative example, the waiting time can be changed on the basis of a required time from assertion of the chip select signal /S to start of supply of the read command (03h). This time is predetermined on the basis of the design of the serial memory 300.

Figure 5:
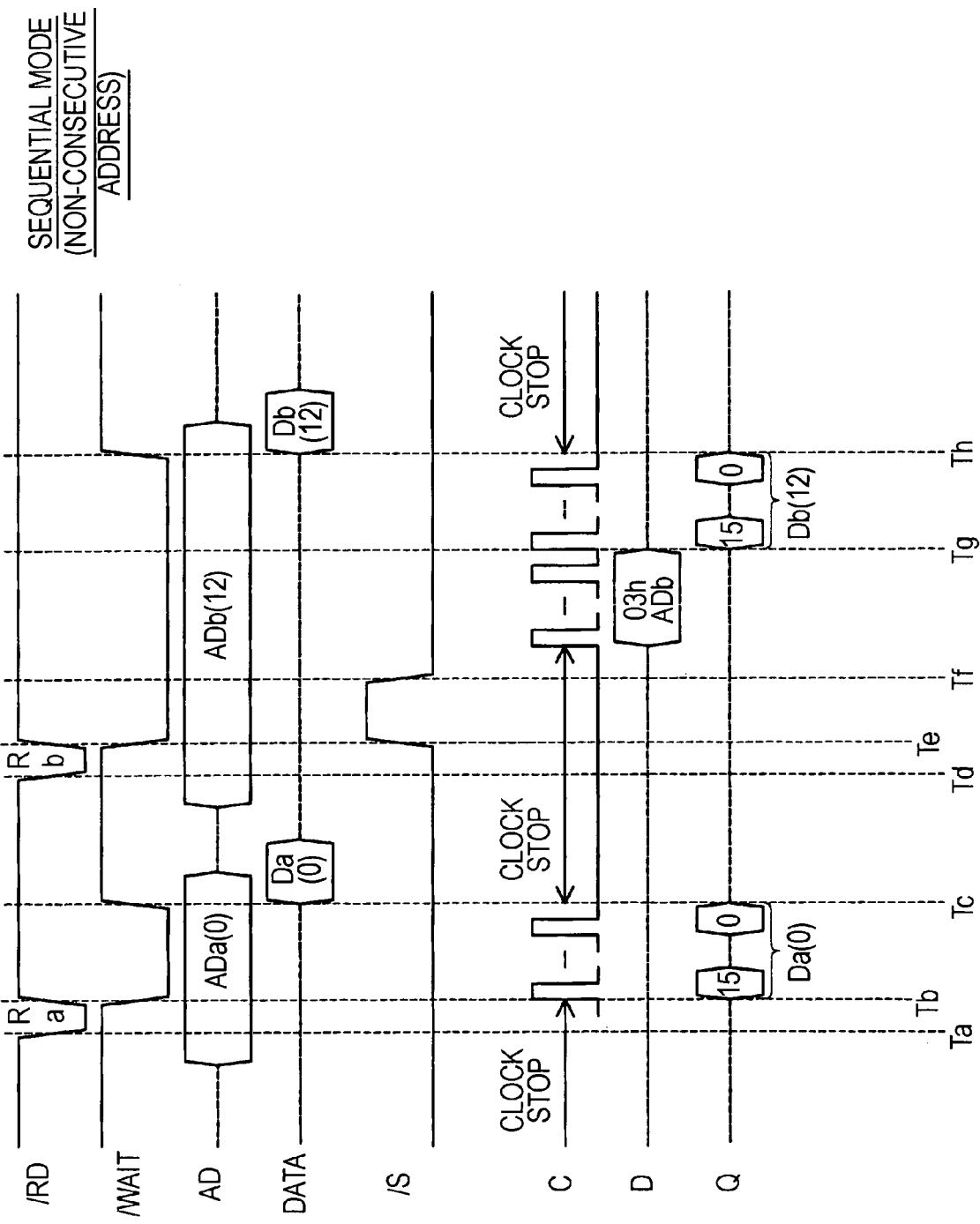
FIG. 5 is a timing chart showing a process using the sequential mode according to an embodiment of the invention in a case where read requests of non-consecutive addresses are received.

FIG. 5 is a timing chart showing a process using the sequential mode according to an embodiment of the invention in a case where read requests of non-consecutive addresses are received. When an address designated by a read request is different from an address next to the address designated by the previous read request, data of the request address is not immediately output from the serial memory 300 by restarting the supply of the clock signal. Thus, the module controller 210 supplies the read command and the address to the serial memory 300 again.

In the example shown in FIG. 5, a second address ADb is different from an address next to the first address ADa. Thus, the module controller 210 asserts the wait signal /WAIT in response to the second read request Rb and negates the chip select signal /S. As a result, the read command is completed (at timing Te). Then, the module controller 210 asserts a chip select signal /S (at timing Tf). A time during which the chip select signal /S is maintained to be in an inactive state is predetermined to be adjusted to the design of the serial memory 300 (at timings Te to Tf). This time is also called a "deselect time".

The process after the chip select signal /S is asserted is the same as the process shown in FIG. 3 after the chip select signal /S is asserted. In other words, a read command (03h) and an address (ADb) are supplied to the serial memory 300, and data output from the serial memory 300 is supplied to the CPU 700. Then, the supply of the clock signal C is stopped.

As described above, when a read request of non-consecutive address is received in a sequential mode, the read command is completed by negating the chip select signal /S. Then, a new read command is started by asserting the chip select signal /S again and supplying the read command and the address to the serial memory 300. As a result, it is possible to supply appropriate data.

Figure 6:
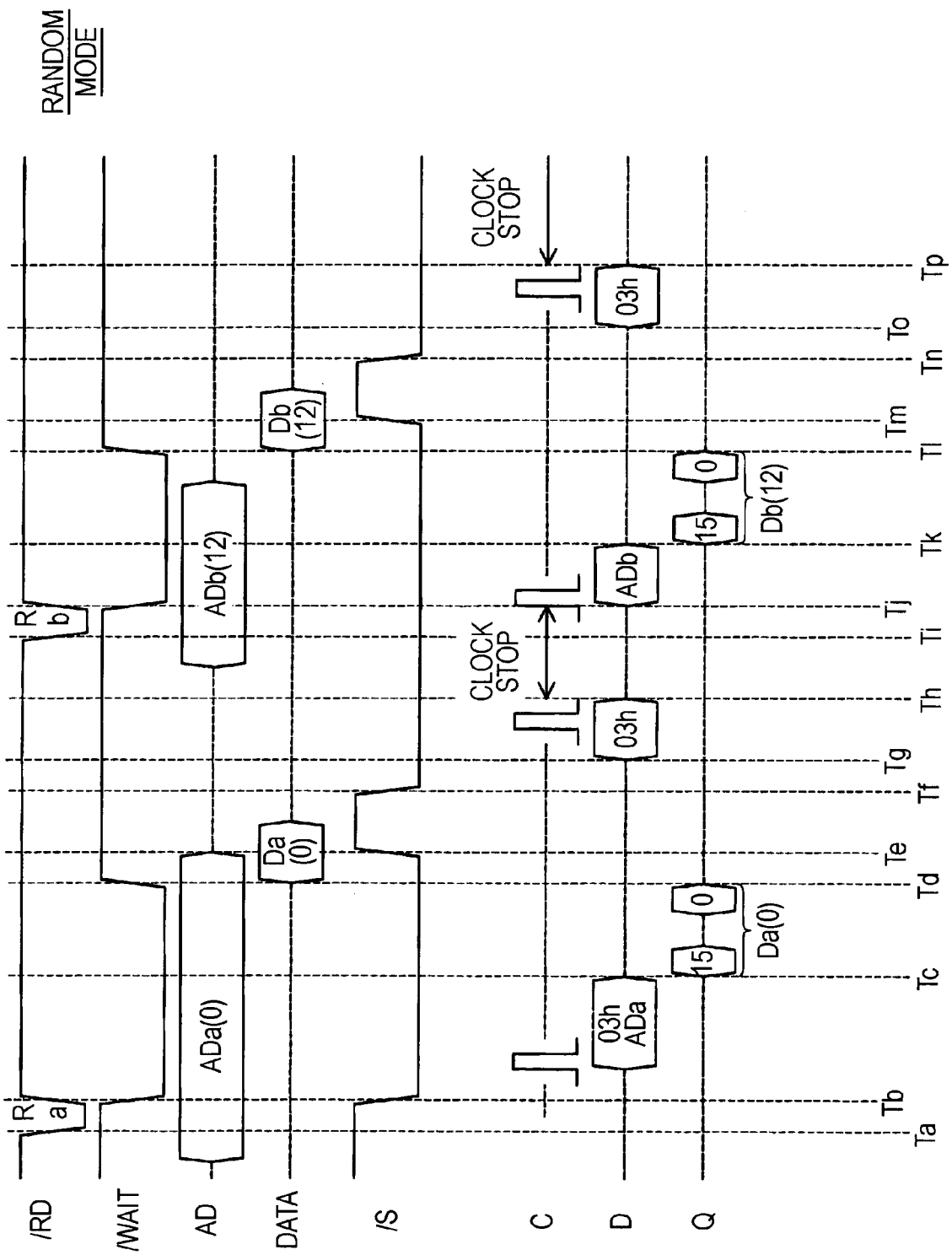
FIG. 6 is a timing chart showing a supply process using a random mode according to an embodiment of the invention.

FIG. 6 is a timing chart showing a supply process using a random mode according to an embodiment of the invention. The random mode is a special mode for a case where a plurality of read requests in which request addresses are arbitrarily set are consecutively received.

The process from reception of the first read request Ra to completion of output of the first data Da corresponding to this first read request Ra is the same as that in the sequential mode shown in FIG. 3 (at timings Ta to Td). In response to completion of output of the first data Da, the module controller 210 negates the wait signal /WAIT and supplies the first data Da to the CPU 700 by using the data signal DATA (at timing Td). Next, the module controller 210 completes the read command by negating the chip select signal /S (at timing Te).

Next, the module controller 210 asserts a chip select signal /S before reception of the next read request (at timing Tf). After asserting the chip select signal /S, the module controller 210 supplies a read command (03h) to the serial memory 300 (at timings Tg to Th).

The module controller 210 stops the supply of the clock signal C in response to the completion of supply of the read command (03h) (at timing Th). However, the chip select signal /S is maintained to be in an active state. As a result, the operation of the serial memory 300 is stopped to be in a state that an address can be received.

Then, the CPU 700 transmits a second read request Rb that is the next read request to the controller 200 at an arbitrary timing (at timing Ti). An address designated by the second read request Rb is not limited to an address (first address ADa) next to the address of the previous read request and may be arbitrarily set (in the example shown in FIG. 6, an address apart from the first address ADa by 12 is used). As described above, it is frequently performed to read data of an arbitrary address. For example, there is a case where a specific data is read from a look up table stored in the memory or a specific color component of a pixel of image data stored in the memory is read.

In response to the second read request Rb, the module controller 210 asserts an wait signal /WAIT, restarts the supply of the clock signal C, and supplies the second address ADb by using the input data signal D (at timing Tj). In response to the supply of the second address ADb, the serial memory 300 outputs second data Db corresponding to the address ADb one bit by one bit (at timings Tk to Tl).

The process responding to the completion of output of the second data Db is the same as that responding to the completion of output of the first data Da. As a result, the CPU 700 acquires the second data Db represented by the data signal DATA, and the operation of the serial memory 300 is stopped in a state that a new address can be received.

Then, the module controller 210 performs operations for negating and asserting the chip select signal /S, supplies a new read command to the serial memory 300 in advance, and stops supply of the clock signal C, each time supply of requested data to the CPU 700 is completed. As a result, in the random mode, a time from the reception of the read request to the supply of data of the requested address is shortened. As a result, the data stored in the serial memory 300 can be used in a speedy manner.

In particular, in the random mode shown in FIG. 6, an 8-clock time or more for a read command (8 bits) is shortened for one read request. For a read request from the second read request and thereafter, a waiting time for one read request is 40 clocks (24 clocks (address)+16 clocks (data), for example, timings Tj to Tl). On the other hand, in the comparative example shown in FIG. 4, the waiting time for one read request is at least 48 clocks (for example, timings Te2 to Tg). As described above, data to be randomly read is appropriate for the random mode.

When receiving a next read request before completion of supply of the read command (03h) to the serial memory 300, the module controller 210 performs the process as below. The module controller 210 asserts a wait signal /WAIT and supplies an address to the serial memory 300 following the read command without stopping the clock signal C.

Figure 7:
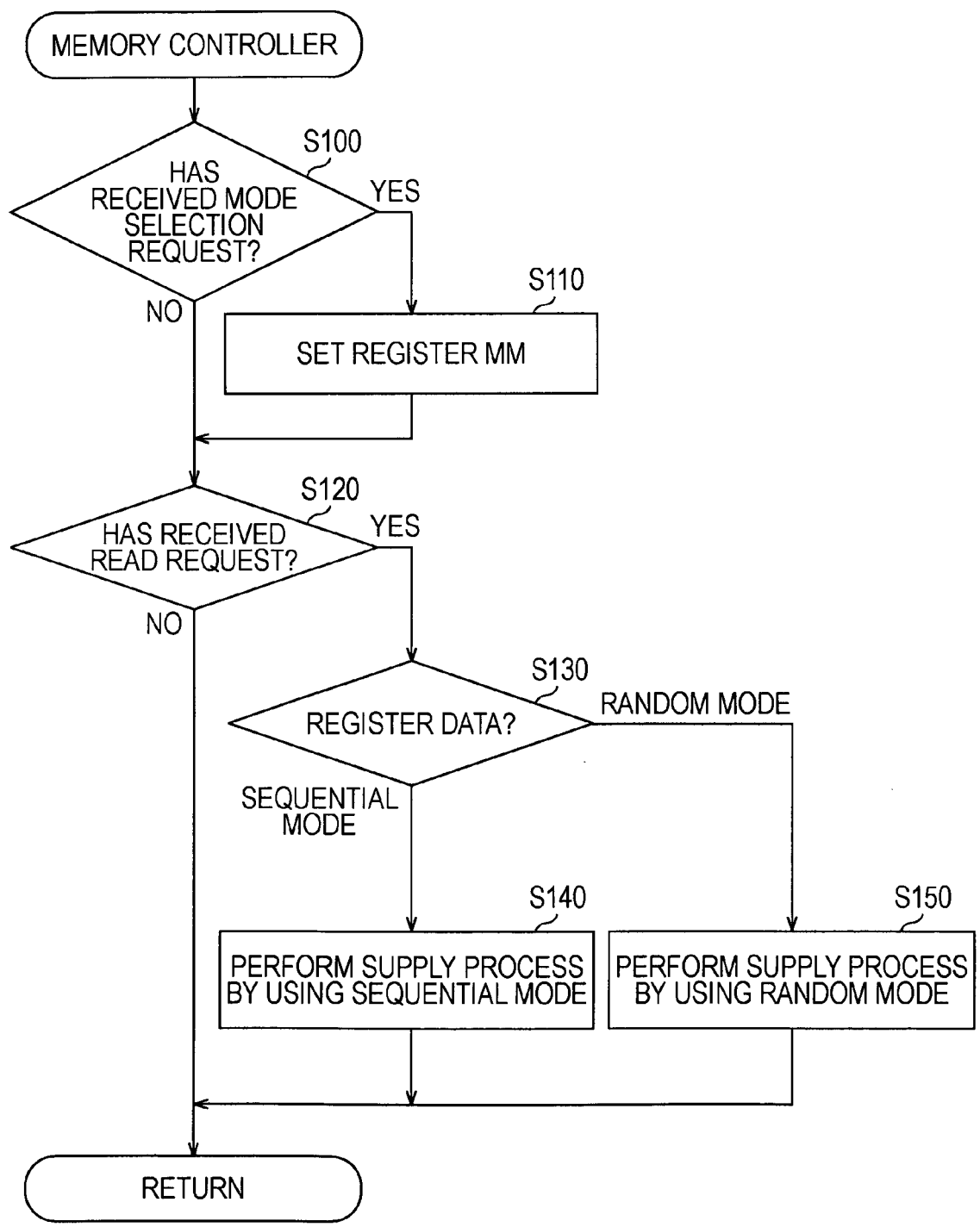
FIG. 7 is a flowchart showing a sequence of a memory control process according to an embodiment of the invention.

FIG. 7 is a flowchart showing a sequence of the memory control process according to an embodiment of the invention. In the first embodiment, the module controller 210 selectively uses the sequential mode and the random mode, following this sequence.

In the first step S100, the module controller 210 determines whether a mode selection request has been received from the CPU 700. An arbitrary format may be used for this request. In the first embodiment, a write request for a predetermined address is used as the mode selection request. As data to be written, data representing one between the sequential mode and the random mode is supplied from the CPU 700. This mode selection request is transmitted to the memory controller 200 from the CPU 700 through the bus 500 by using a write request signal (not shown), an address signal AD, and a data signal DATA.

When receiving the mode selection request, in the next step S110, the module controller 210 stores data representing the selected mode in a mode memory MM (also referred to as a register MM).

In the next step S120, the module controller 210 determines whether a read request has been received from the CPU 700. When receiving the read request, the module controller 210 refers to the register data stored in the register MM in the next step S130.

When the register data represents the sequential mode, the module controller 210 performs a supply process by using the sequential mode in Step S140. When the sequential mode is selected for the previous read request, the module controller 210, as described with reference to FIG. 3, acquires data by controlling the clock signal C. On the other hand, when the random mode is selected for the previous read request, the operation of the serial memory 300 is stopped in a state that an address can be received. Thus, the module controller 210 restarts supply of the clock signal C, supplies the address to the serial memory 300, and acquires data from the serial memory 300. In any case, the process after data is acquired from the serial memory 300 is the same as the process described with reference to FIG. 3.

When the register data represents the random mode, the module controller 210 performs a supply process using the random mode in Step S150. When the random mode is selected for the previous read request, the module controller 210, as described with reference to FIG. 6, acquires data by supplying the address. On the other hand, when the sequential mode is selected for the previous read request, the module controller 210 performs operations for negating and asserting the chip select signal /S and acquires data by supplying the read command and the address to the serial memory 300. In any case, the process after data is acquired from the serial memory 300 is the same as the process described with reference to FIG. 6.

After completing the supply process, the module controller 210 proceeds back to Step S100. Then, the process shown in FIG. 7 is repeated.

As described above, in the memory control process shown in FIG. 7, the module controller 210 selects a mode of the supply process in accordance with the direction of the CPU 700. As a result, data stored in the memory can be used in a speedy manner in accordance with the content of the process performed by the CPU 700. Here, it is preferable that the CPU 700 designates the mode of the supply process as below. It is preferable that the sequential mode is designated in a case where data of a plurality of consecutive addresses are sequentially read one after another. In addition, it is preferable that the random mode is designated in a case where data of non-consecutive addresses is read. Accordingly, a time from the reception of the read request performed by the memory controller 200 to the supply of data can be shortened in accordance with the content of the process performed by the CPU 700. As a mode selecting method of the CPU 700, any arbitrary method can be used. For example, a program executed by the CPU 700 may be configured to perform the selection in advance.

In a case where a program is stored in a non-volatile memory such as the serial flash memory 300 having relatively slow speed, technology (also called "code shadow") described below is frequently used. The code shadow is technology in which the whole program is copied into a RAM having a relatively high speed and the CPU 700 executes the program stored in the RAM after completion of the copy. In this embodiment, data stored in the serial memory 300 can be used in a speedy manner. As a result, even in a case where the CPU 700 directly executes a program code stored in the serial memory 300 without using the RAM (code shadow), it is possible to suppress reduction of processing speed of the CPU 700. However, the code shadow may be configured to be used. In such a case, copy of data can be performed at high speed.

B. Second Embodiment

Figure 8:
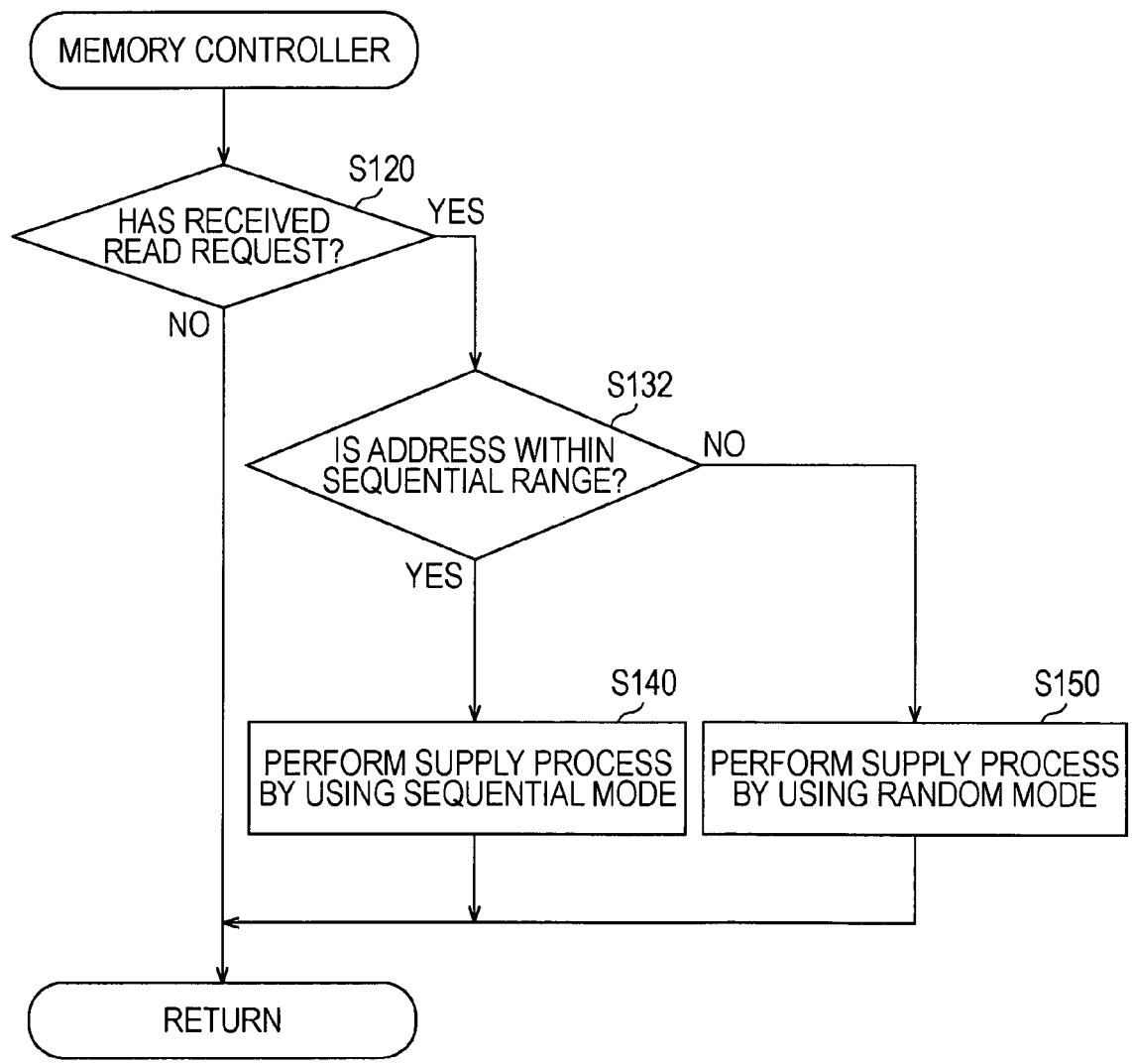
FIG. 8 is a flowchart showing a sequence of a memory control process according to another embodiment of the invention.

FIG. 8 is a flowchart showing the sequence of another example of the memory control process according to an embodiment of the invention. Only differences between the memory control process shown in FIG. 7 and the memory control process of this example is that Steps S100 and S110 are omitted and Step S130 is replaced with Step S132 in this embodiment. The process of other steps is the same as that shown in FIG. 7. In this memory control process, the module controller 210 selects a mode of the supply process in accordance with a request address instead of the direction from the CPU 700.

In Step S132, the module controller 210 determines whether the request address is within a predetermined sequential range. When the request address is within the sequential range, the module controller 210 proceeds to Step S140, and performs the supply process using the sequential mode. On the other hand, when the request address is beyond the sequential range, the module controller 210 proceeds to Step S150, and performs the supply process using the random mode.

FIG. 9 is a schematic diagram showing an example of the sequential range according to an embodiment of the invention. In the example shown in FIG. 9, the range of the request address is 000000h to FFFFFFh. In addition, the range from 000000h to 00FFFFh is set to be the sequential range. The random mode is in correspondence with the other addresses (hereinafter, also referred to as a random range).

In FIG. 9, an example of the ranges of addresses and types of data are shown. In the sequential range, a program code is stored. In addition, in the random range, a look-up table is stored. These data types show an example in a case where the data processing apparatus 900 is installed to a printer. For example, the CPU 700 generates print data from input image data input to the data processing apparatus 900 by executing the program stored in the sequential range. When the CPU 700 acquires a program from the memory module 100, the request address is within the sequential range, and accordingly, the sequential mode is selected. As a result, data (program code) can be supplied to the CPU 700 from the memory module 100 in a speedy manner.

The print data is generated by converting pixel values (also referred to as input pixel values) of input image data into the amounts of ink. The look-up table stored in the random range represents a correspondence relationship between input pixel values and the amounts of the ink. The CPU 700 acquires the amount of the ink corresponding to the input pixel value from the look-up table. In this case, since the request address is beyond the sequential range (that is, within the random range), the random mode is selected. As a result, specific data (the amount of ink) corresponding to the input pixel value in the look-up table can be supplied to the CPU 700 from the memory module 100 in a speedy manner.

As described above, in the memory control process shown in FIG. 8, the module controller 210 selects the mode of the supply process in accordance with the request address. Thus, as described above, it is preferable that data (for example, a program) appropriate for the sequential mode is stored in the sequential range and data (for example, the lookup table) appropriate for the random mode is stored in the random range. Accordingly, data can be supplied in a speedy manner from the memory module 100 to the CPU 700.

Information determining the sequential range and the random range is stored in the mode memory MM of the module controller 210 in advance. As the format of this information, an arbitrary format that can determine ranges of addresses can be used. For example, each address range can be specified by a combination of a start address and an end address. Each address range can be specified by a combination of a start address and a range size. Furthermore, each address range can be specified by an address representing the boundary of the sequential range and the random range.

In the example shown in FIG. 9, although the sequential range is one continuous range, a plurality of ranges apart from one another may be collectively used as the sequential range. This also applies to the random range.

When the memory control process of the second embodiment is used, a first stage in which read operations for the sequential range are continuously performed and a second stage in which read operations for the random range are continuously performed may be used. For example, it is possible for the CPU 700 to access the memory module 100 by using two stages as described below. In a first stage, the whole (or a part) of the program code is copied from the memory module 100 to a RAM not shown in the figure. In a second stage, a program is executed in accordance with the program code stored in the RAM. In this second stage, conversion of input pixel values into the amounts of ink is performed by referring to the lookup table of the random range. Accordingly, delay of data supply due to shift between the sequential mode and the random mode can be suppressed.

C. Third Embodiment

Figure 10:
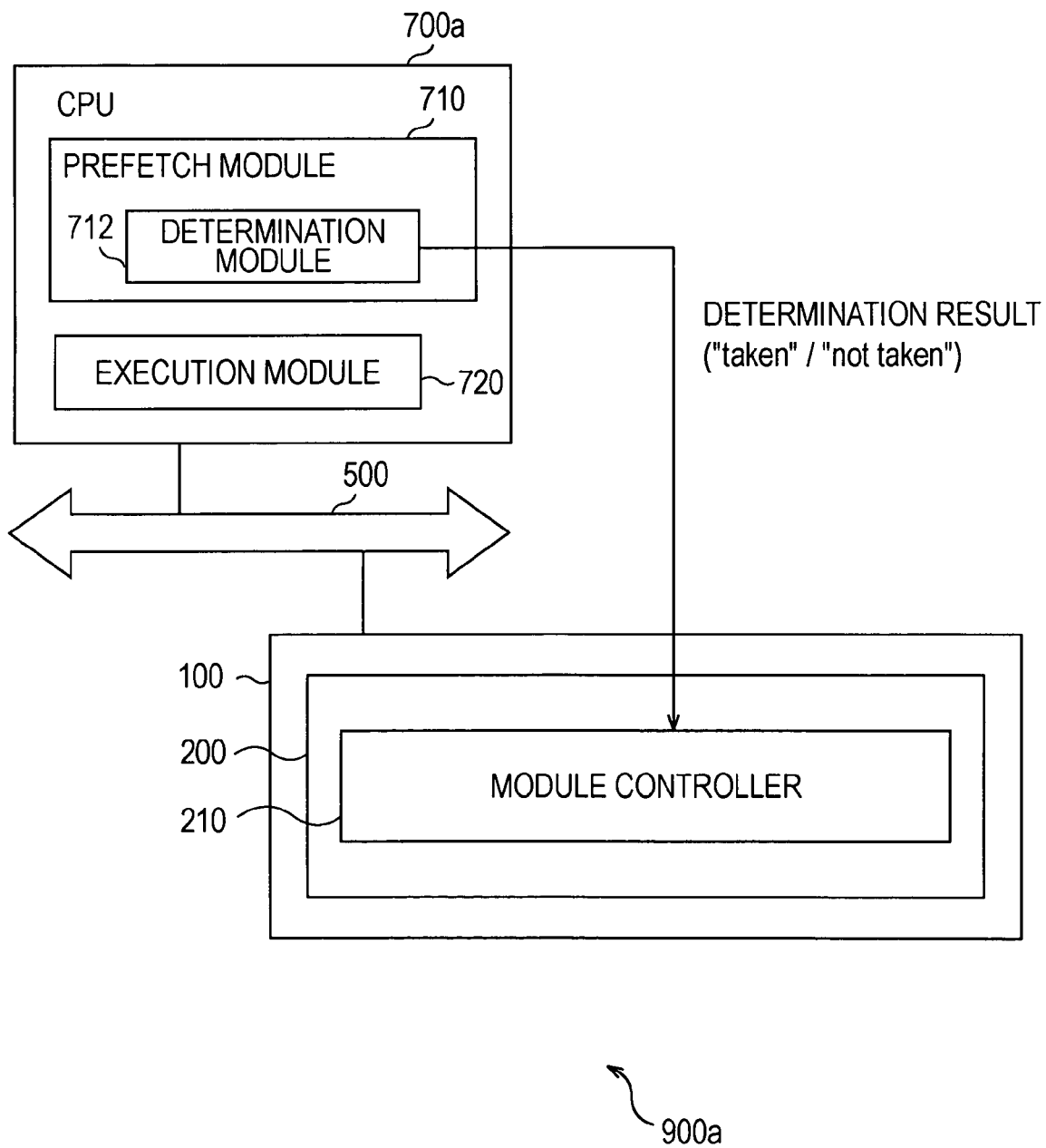
FIG. 10 is a schematic diagram showing a data processing apparatus according to another embodiment of the invention.

FIG. 10 is a schematic diagram showing the data processing apparatus according to another embodiment of the invention. There are two differences between this data processing apparatus and the data processing apparatus 900 shown in FIG. 1. The first difference is that the CPU 700a has a prefetch module 710 and an execution module 720 in this embodiment. The second difference is that the module controller 210 selects a mode of the supply process in accordance with the result of determination of the prefetch module 710 (determination module 712). In addition, in the data processing apparatus 900a shown in FIG. 10, the configuration of the memory module 100 is the same as that of the memory module 100 shown in FIG. 1, and components other than the module controller 210 of the memory controller 200 are omitted in the figure.

The execution module 720 performs a process in accordance with the program code. In this embodiment, the program code is stored in the memory module 100 (the serial memory 300). The prefetch module 710 acquires the program code from the memory module 100 before the program code is executed by the execution module 720. The program code, as in the above-described embodiments, is acquired by transmitting a read request to the memory module 100 through the bus 500.

The prefetch module 710 has a determination module 712. The determination module 712 performs so called a branch prediction. In particular, the determination module 712 determines whether the prefetch address (a request address corresponding to the program code to be newly acquired) is set to be the next consecutive address (the next address means an address next to the request address corresponding to the last acquired program code). In other words, the determination module 712 determines whether to acquire a program code of the next consecutive address (also called "not taken") or to acquire a program code of the branched destination (also called "taken"). When a program code acquired last is a command without a branch on the basis of determination of a condition, it is determined that data from the next consecutive address should be acquired. The prefetch module 710 sets the prefetch address (request address) to be the next consecutive address in a case where the result of the determination is "not taken". On the other hand, in a case where the result of the determination is "taken", the prefetch module sets the prefetch address to be the branch destination address. As the method of predicting the branch, various methods known in public can be used.

The information indicating the result of the determination is directly supplied to the memory controller 200 from the determination module 712 not through the bus 500. However, the result of the determination may be configured to be supplied to the memory controller 200 through the bus 500.

Figure 11:
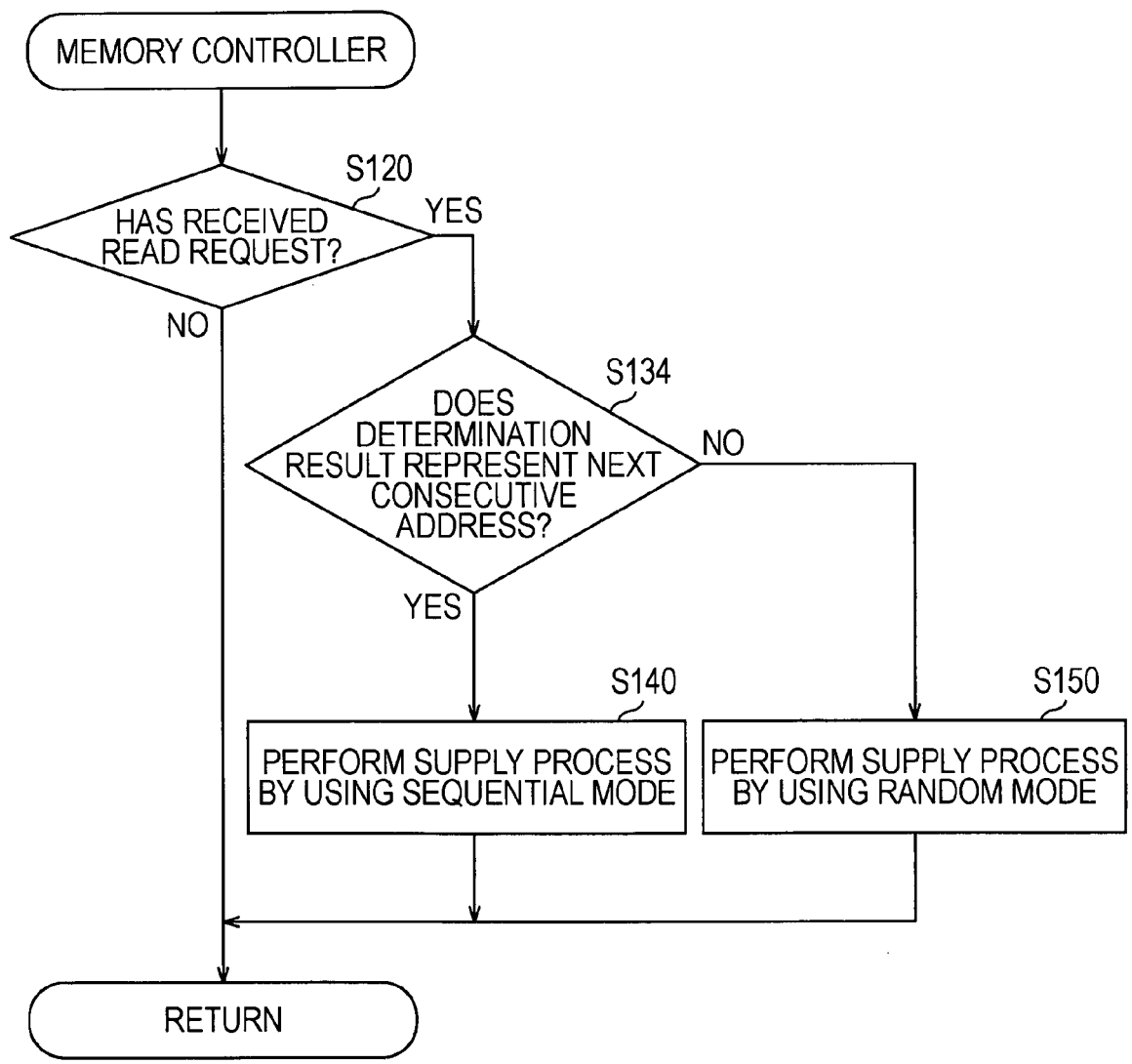
FIG. 11 is a flowchart showing a sequence of the memory control process according to a third embodiment of the invention.

FIG. 11 is a flowchart showing the sequence of the memory control process according to the third embodiment of the invention. The only difference between this memory control process and the memory control process shown in FIG. 8 is that Step S132 is replaced with Step S134 in this embodiment. The process of other Steps is the same as that shown in FIG. 8. In this memory control process, the module controller 210 selects a mode of the supply process in accordance with the result of the determination of the branch prediction.

In Step S134, the module controller 210 determines whether the result of the determination supplied from the determination module 712 indicates acquisition of data from the next consecutive address. When the result of the determination indicates acquisition of data from the next consecutive address, the module controller 210 proceeds to Step S140, and performs the supply process using the sequential mode. On the other hand, when the result of the determination does not indicate acquisition of data from the next consecutive address, the module controller 210 proceeds to Step S150, and performs the supply process using the random mode.

As described above, in the memory control process shown in FIG. 11, the module controller 210 selects the mode of the supply process in accordance with the result (result of the branch prediction) of determination of the CPU 700a (the determination module 712). As a result, when read requests for the next consecutive addresses are issued consecutively, fast supply of data using the sequential mode can be made. In the memory control process shown in FIG. 11, the mode memory MM may not be configured to be used. Accordingly, the mode memory MM may be omitted.

D. Fourth Embodiment

Figure 12:
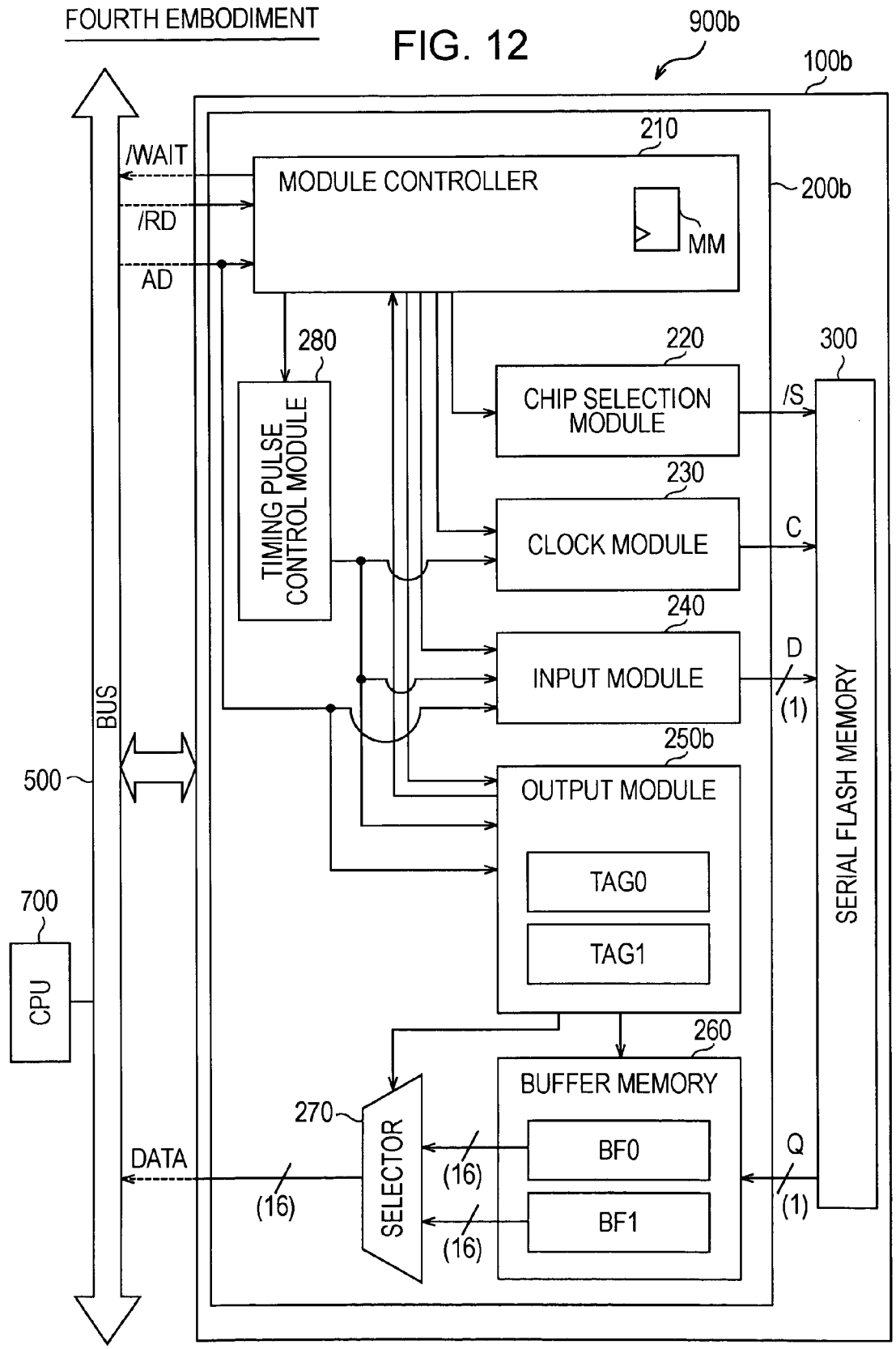
FIG. 12 is a schematic diagram showing another example of the data processing apparatus according to an embodiment of the invention.

FIG. 12 is a schematic diagram showing another example of the data processing apparatus according to an embodiment of the invention. There are two differences between this data processing apparatus and the data processing apparatus 900 shown in FIG. 1. The first difference between this data processing apparatus and the data processing apparatus shown in FIG. 1 is that a buffer memory 260 and a selector 270 are added to the memory controller 200b of the memory module 100b in this data processing apparatus. The second difference between this data processing apparatus and the data processing apparatus shown in FIG. 1 is that the output module 250b has two address memories TAG0 and TAG1. Each address memory TAG0 or TAG1 stores data representing one address. Other configurations of the data processing apparatus 900b is the same as that of the data processing apparatus 900 shown in FIG. 1.

The buffer memory 260 has two buffer areas BF0 and BF1. Each buffer address BF0 or BF1 stores data of one address. In addition, the buffer memory 260 stores data output from the serial memory 300 in one buffer area selected by the output module 250b (that is, the module controller 210). The selector 270 supplies data of one buffer area selected by the output module 250b (that is, the module controller 210) to the bus 500 by using the data signal DATA. In the first address memory TAG0, an address of the data stored in the first buffer area BF0 is stored. In the second address memory TAG1, an address of the data stored in the second buffer area BF1 is stored.

Figure 13:
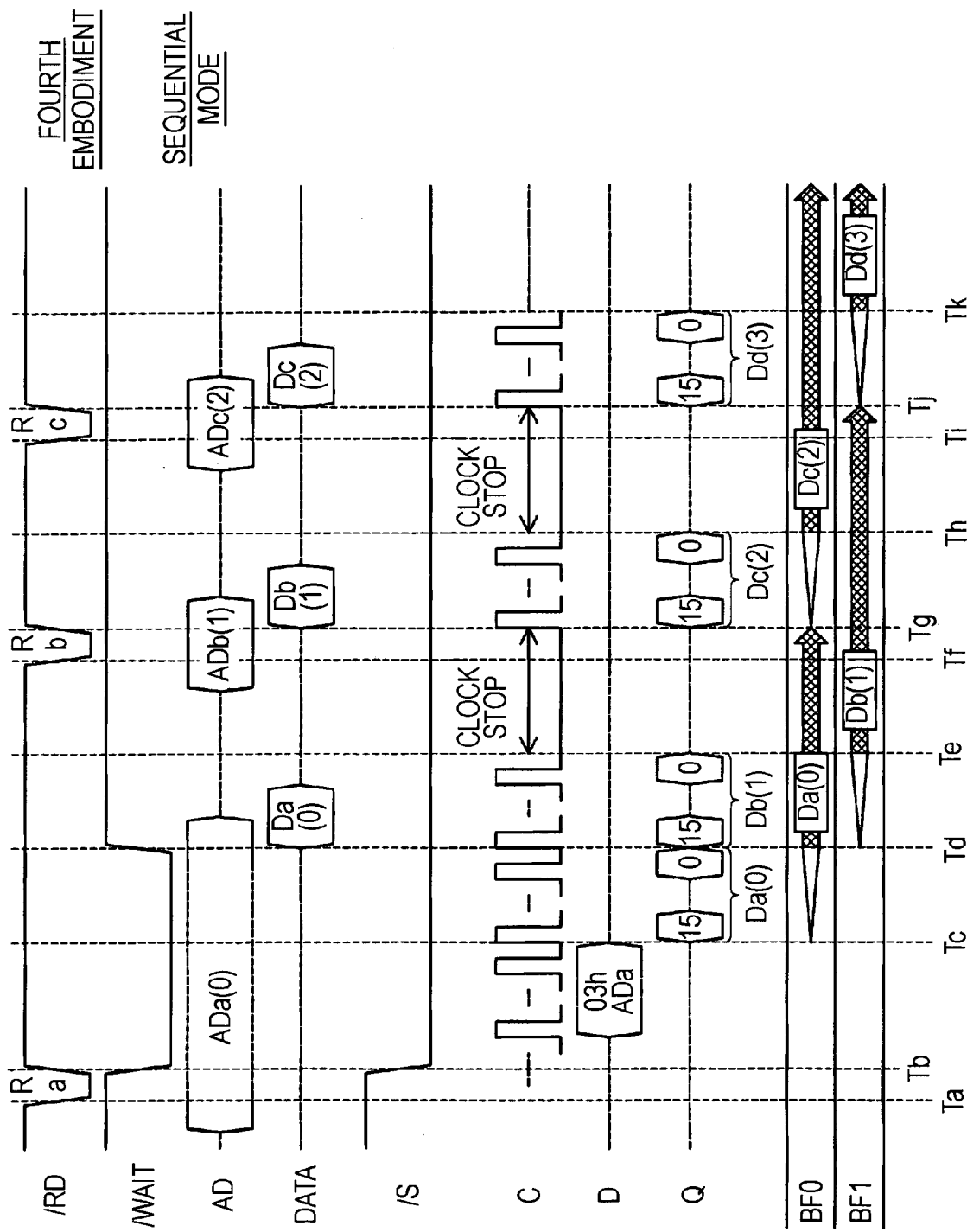
FIG. 13 is a timing chart showing a supply process using a sequential mode according to an embodiment of the invention.

FIG. 13 is a timing chart showing the supply process using the sequential mode according to an embodiment of the invention. In this timing chart, three read requests Ra, Rb, and Rc which are the same as in the example shown in FIG. 3 are received. However, in the sequence shown in FIG. 13, data prediction using two buffer areas BF0 and BF1 is performed, which is different from the sequence shown in FIG. 3. In this timing chart, data stored in the buffer areas BF0 and BF1 are also shown.

The process from the reception of the first read request Ra to the completion of output of the first data Da corresponding to the first read request Ra is the same as the sequence shown in FIG. 3 (at timing Ta to Td). The first data Da output from the serial memory 300 is stored in the first buffer area BF0. In the first address memory TAG0, data representing the first address ADa is stored (not shown).

In response to completion of output of the first data Da, the module controller 210 negates the wait signal /WAIT and supplies the first data Da to the CPU 700 by using the data signal DATA (at timing Td). At this moment, the second buffer area BF1 is vacant. Thus, the module controller 210 acquires the second data Db of the next address without stopping the clock signal C. The acquired second data Db is stored in the second buffer area BF1. In the second address memory area TAG1, data representing the second address ADb is stored (not shown).

In response to completion of output of the second data Db, the module controller 210 stops the supply of the clock signal C (at timing Te). The chip select signal /S is maintained to be asserted without being negated. As a result, the operation of the serial memory 300 is stopped in a state that data (third data Dc(2)) of a third address ADc(2) resulted from adding two to the first address ADa(0) can be output.

Then, the CPU 700 transmits the second read request Rb that is the next read request to the memory controller 200b at an arbitrary timing (at timing Tf). At this moment, the second data Db is already stored in the second buffer area BF1. Thus, in response to the second read request Rb, the module controller 210 does not assert an wait signal /WAIT and supplies the second data Db to the CPU 700 by using the data signal DATA (at timing Tg). In addition, the output module 250b determines a buffer area, in which requested data is to be stored, between the two buffer areas BF0 and BF1 by referring to the address memories TAG0 and TAG 1. This determination process may be configured to be performed by the module controller 210.

The supply of the second data Db means that the first buffer area BF0 for storing the first data Da that is the previous data is vacant. Thus, the module controller 210 starts supply of the clock signal C in response to the second read request Rb (at timing Tg). In response to the supply of the clock signal C, the serial memory 300 outputs a third data Dc of the next address ADc (at timings Tg to Th). The output third data Dc is stored in the first buffer area BF0. In the first address memory TAG0, data representing the third address ADc is stored (not shown).

In response to completion of output of the third data Dc, the module controller 210 stops the supply of the clock signal C (at timing Th). The operation of the serial memory 300 is stopped in a state that data of a fourth address resulted from adding two to the second address ADb(1) can be output.

Then, the module controller 210 acquires data estimated to be requested for being read in the future from the serial memory 300 in advance by repeating restarting and stopping the clock signal C and stores the acquired data in the buffer memory 260. Then, in response to the next read request, the module controller 210 supplies the data stored in the buffer memory 260 to the CPU 700. As a result, in response to the read request, it is possible to supply the data of the requested address to the CPU 700 without causing the CPU 700 to wait. In the example shown in FIG. 3, as the second data Db corresponding to the second read request Rb, the third data Dc corresponding to the third read request Rc is supplied.

Figure 14:
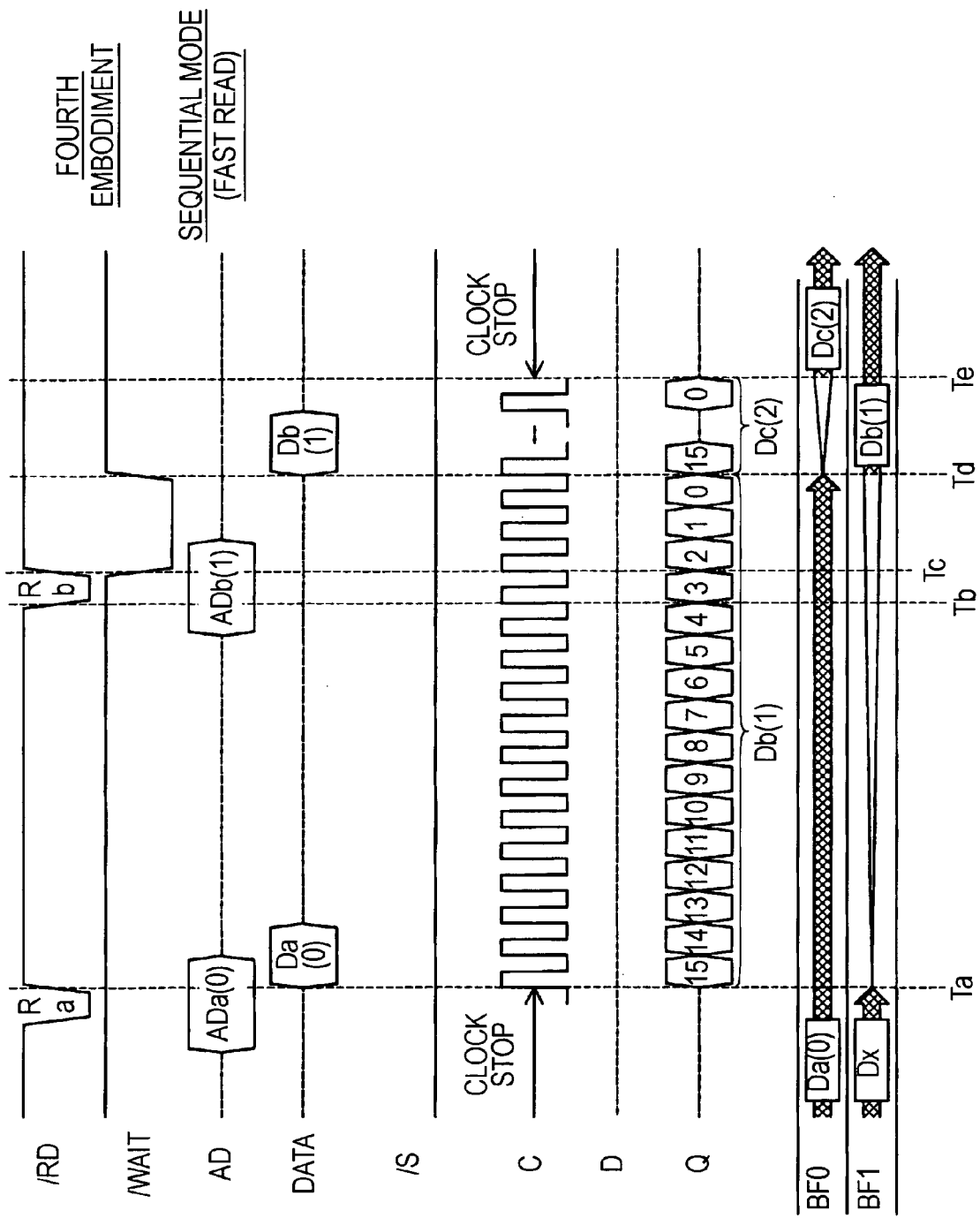
FIG. 14 is a timing chart showing a process using the sequential mode according to an embodiment of the invention in a case where a read request is received at a fast timing.

FIG. 14 is a timing chart showing a process using the sequential mode according to an embodiment of the invention in a case where a read request is received at a fast timing. In the example shown in FIG. 14, the first data corresponding to the first read request Ra is already stored in the first buffer area BF0 in the sequence of the sequential mode described with reference to FIG. 13. Then, in response to the first read request Ra, the first data Da is supplied to the CPU 700 from the first buffer area BF0 (at timing Ta). In addition, output of the second data Db that is the next data from the serial memory 300 is started by restarting the supply of the clock signal C (at timing Ta).

In the example shown in FIG. 14, the second read request Rb that is the next read request is received at a timing earlier than completion (at timing Td) of output of the second data Db. In this case, the module controller 210 asserts a wait signal /WAIT in response to the second read request Rb (at timing Tc). Then, in response to the completion of output of the requested second data Db, the module controller 210 negates the wait signal /WAIT and supplies the second data Db to the CPU 700 by using the data signal DATA (at timing Td).

Since the first buffer area BF0 is vacant at a time point when the second data Db is supplied, the module controller 210 acquires the third data Dc of the next address without stopping the clock signal C. In response to the completion of output of the third data Dc, the module controller 210 stops the supply of the clock signal C (at timing Te).

As described above, when the read request is received at an earlier timing, the module controller 210 asserts a wait signal /WAIT until requested data can be supplied. As a result, appropriate data can be supplied to the CPU 700.

Figure 15:
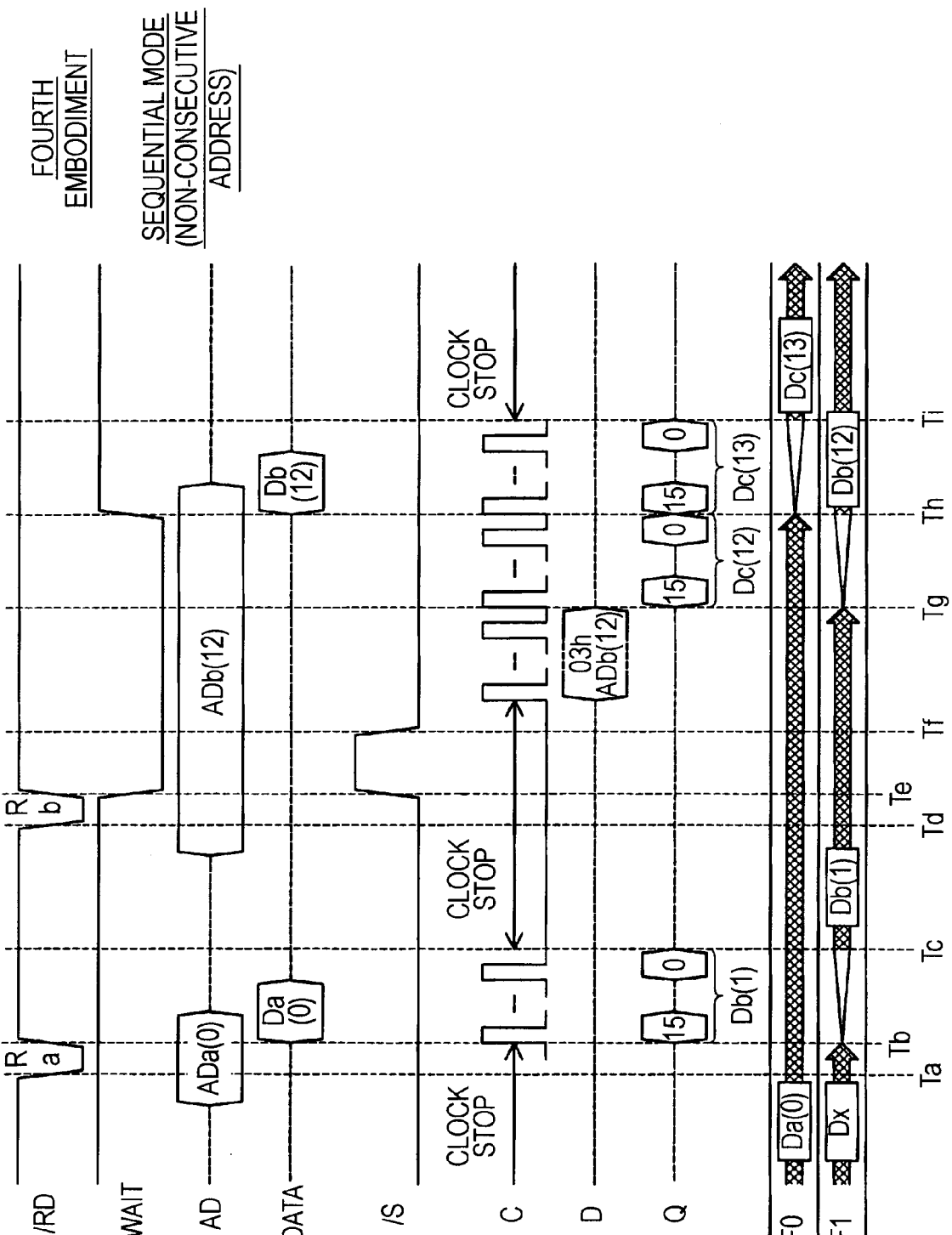
FIG. 15 is a timing chart showing a process using the sequential mode according to an embodiment of the invention in a case where read requests of non-consecutive addresses are received.

FIG. 15 is a timing chart showing a process using the sequential mode according to an embodiment of the invention in a case where read requests of non-consecutive addresses are received. In this timing chart, two read requests Ra and Rb which are the same as in the example shown in FIG. 5 are received. The process for responding to the first read request Ra is the same as that in the example shown in FIG. 13 (at timings Ta to Tc).

In the second read request Rb that is the next read request, an address ADb(12) different from an address next to the first address ADa(0) is designated. Thus, in response to the second read request Rb, the module controller 210 asserts a wait signal /WAIT and negates the chip select signal /S (at timing Te). As a result, the read command is completed. Then, the module controller 210 asserts the chip select signal /S (at timing Tf).

The process after the chip select signal /S is asserted is the same as that after the chip select signal /S is asserted which is shown in FIG. 13. In the example shown in FIG. 15, after the chip select signal /S is asserted, the module controller 210 restarts supply of the clock signal C and supplies a read command (03h) and a second address ADb to the serial memory 300. Then, in response to the completion of output of the second data Db from the serial memory 300, the module controller 210 supplies the second data Db to the CPU 700 (at timing Th). In addition, the module controller 210 acquires a third data Dc of the next address by continuing to supply the clock signal C (at timings Th to Ti). In response to the completion of acquisition of the third data Dc, the module controller 210 stops the supply of the clock signal C (at timing Ti).

As described above, when a read request for non-consecutive address is received in the sequential mode, the read command and the request address are supplied to the serial memory 300 again. As a result, appropriate data can be supplied.

There may be a case where a read request for a non-consecutive address is received during a data output process from the serial memory 300. In such a case, the module controller 210 stops output of the data by negating the chip select signal /S in response to the read request. Then, the module controller 210 acquires the requested data by starting a new read command.

In addition, the memory controller 200b shown in FIG. 12 performs a same process as the process shown in FIG. 6 as the supply process using the random mode. As the memory control process performed by this memory controller 200b, an arbitrary process among processes (FIGS. 7, 8, and 11) of the above-described embodiments can be used.

E: MODIFIED EXAMPLES

Among constituent elements of the above-described embodiments, elements other than elements claimed as an independent claim are additional elements, and thus can be appropriately omitted. The present invention is not limited to the above-described embodiments or examples, and various embodiments can be performed without departing from the gist of the invention. For example, the following modifications can be made.

Modified Example 1

In the above-described embodiments, the data length of the CPU 700 or 700a and the data length of the serial memory 300 may be configured to be different (here, the data length means the size of data corresponding to one address). In such a case, the correspondence relationship between the request address and the target address is determined in advance and the memory controller 200 or 200b determines the target address corresponding to the request address by using the correspondence relationship. For example, when the data length of the CPU 700 or 700a is twice the data length of the serial memory 300, two target addresses are in correspondence with one request address. In addition, in response to one read request, the memory controller 200 or 200b supplies data of the two target addresses to the CPU 700 or 700a.

Even when the data length of the CPU 700 or 700a and the data length of the serial memory 300 are the same, a target address corresponding to the request address may be configured to be shifted from the request address.

In any case, it is preferable that the correspondence relationship is determined such that a target address corresponding to a request address can be sequentially followed in a case where the request address is sequentially followed. Accordingly, with a plurality of consecutive request addresses a plurality of consecutive target addresses in the same order as the plurality of consecutive request addresses is in correspondence. As a result, the memory controller 200 or 200b can acquire appropriate data corresponding to the request address in the sequential mode from the serial memory 300.

Modified Example 2

In the above-described embodiments, the selection process for selecting a mode for performing the supply process between the sequential mode and the random mode is not limited to the processes shown in FIGS. 7, 8, and 11, and as the selection process, any arbitrary process may be employed. In particular, a direction signal line may be connected to the memory controller 200. In such a case, when the direction signal line is set to be level H, the sequential mode may be configured to be selected. On the other hand, when the signal line is set to be level L, the random mode may be configured to be selected.

In addition, in the above-described embodiments, the module controller 210 may have a plurality of modes for the selection process. For example, the module controller 210 may have a plurality of selection modes including a plurality of selection modes which has been arbitrary selected from among the first selection mode shown in FIG. 7, the second selection mode shown in FIG. 8, and the third selection mode shown in FIG. 11. Here, as the process for selecting one mode among the plurality of selection modes, an arbitrary process can be used. For example, the module controller 210 may select a selection mode in accordance with a given direction. As the direction, an arbitrary direction such as a direction from a user or an external device may be used.

Modified Example 3

In the above-described embodiments, the memory controller 200 or 200b may have only one function between the sequential mode and the random mode. Generally, the memory controller 200 or 200b may be configured to perform the supply process by using at least one between the sequential mode and the random mode.

Modified Example 4

In the sequential mode of the above-described embodiments, as a condition (hereinafter, also referred to as a restart condition) for restarting the supply of the clock signal C, an arbitrary condition that indicates that the memory controller 200 can receive data output from the serial memory 300 without any loss may be used. For example, a condition that data acquired from the serial memory 300 can be directly supplied to the bus 500 (more generally, the external device) or a condition that the buffer memory is vacant may be used. In any case, the module controller 210 is configured to restart the supply of the clock signal C in response to achievement of a predetermined restart condition.

Modified Example 5

In the above-described embodiments, the memory controlled by the memory controller 200 or 200b is not limited to a serial flash memory 300, and various types of memories (for example, various types of semiconductor memories) may be used as the memory. For example, the output data signal Q may be represented in a plurality of signal lines.

Generally, as a memory for which the sequential mode is used, an arbitrary memory that sequentially outputs data from target addresses in synchronization with the clock signal after receiving a read command and target addresses can be used. For example, a signal line for a read command and a signal line for a target address may be configured to be different from each other. In addition, the output order of data is not limited to an ascending order of the addresses and may be a descending order of the addresses. In such a case, in the above-described embodiments, as a "next address", an address decreased by one is used.

In addition, as a memory for which the random mode is used, an arbitrary memory that outputs data of a target address after receiving a read command and a target address can be used. When the sequential mode is not used, a memory not having a function for sequentially outputting data from target addresses in synchronization with the clock signal may be used. When a memory that receives a target address after receiving a read command is used, the advantage of the random mode in which the read command is supplied to the memory in advance is remarkable.

Modified Example 6

In the above-described embodiments, the supply process using the sequential mode is not limited to the processes shown in FIGS. 3, 5, 13, 14, and 15, and various processes may be used as the supply process. In addition, the supply process using the random mode is not limited to the process shown in FIG. 6, and various processes may be used as the supply process. For example, the module controller 210 may be configured to automatically supply a first read command after start of the operation of the memory controller 200 or 200b, before receiving a first read request. In addition, when a memory that can operate without a chip select signal /S is used, control of the chip select signal /S may be omitted. In addition, as the format of the read command, any arbitrary format on the basis of design of the memory may be used. For example, assertion of one predetermined signal may be treated as a read command.

Modified Example 7

In the memory controller 200b shown in FIG. 12, the capacity of the buffer memory 260 can be arbitrarily set. For example, the capacity corresponding to the amount of data for one address may be used. In such a case, the module controller 210 receives a read request in the sequential mode and restarts the supply of the clock signal in response to completion of supply of data requested by the read request to the CPU 700 or 700a. Accordingly, data of the next address can be stored in the buffer memory 260 before the next read request is received without losing data acquired from the memory. Furthermore, the capacity corresponding to the amount of data of three addresses or more may be used.

In any case, it is preferable that the module controller 210 performs the following process as the supply process using the sequential mode. It is preferable that a process in which data corresponding to predetermined N (where N is an integer equal to and larger than one) consecutive addresses that starts from a request address requested by the first read request is acquired from the serial memory 300 in response to the first read request of the supply process using the sequential mode, acquired data is stored in the buffer memory 260, and the supply of the clock signal C is stopped and a process for restarting the supply of the clock signal C in response to achievement of a predetermined condition including reception of predetermined M (M is an integer equal to or larger than one and equal to or smaller than N) read requests are performed. In such a case, the supply process using the buffer in the sequential mode can be started appropriately. For example, in the example shown in FIG. 13, number N is set to be two, and number M is set to be one. The first read request Ra corresponds to the first read request of the supply process using the sequential mode. As the predetermined condition, reception of one read request is used in the example.

The number N represents the capacity of the buffer memory 260 in the number of addresses. For example, when the buffer memory 260 has the capacity corresponding to the data amount of five addresses, the number N is set to be five. The number M may be set to be an arbitrary integer equal to or larger than one and equal to or smaller than N. As the predetermined condition for restarting the supply of the clock signal C, an arbitrary condition including reception of M read requests after stop of supply of the clock signal C may be used. In any case, it is preferable that a condition that data output from the serial memory 300 can be received by the memory controller 200 without any loss is used. This condition is not limited to the first restart and may be used in an arbitrary cycle for repeating to stop and restart the supply. Furthermore, different conditions may be used for each cycle. The amount of data acquired by restart of the clock signal C, that is, a time length from restart of the supply to stop of the supply is determined in advance such that the buffer memory 260 does not overflow. This supply process may be performed similarly in a case where N is set to be a value equal to or larger than three.

Modified Example 8

In the above-described embodiments, the configuration of the data processing apparatus is not limited to those shown in FIGS. 1, 10, and 12, and various configurations may be used as the configuration of the data processing apparatus. For example, the CPU 700 or 700a and the memory controller 200 or 200b may be configured to be directly connected together, not through the bus 500.

In addition, the configuration of the supply control module for performing the supply process is not limited to those shown in FIGS. 1 and 12, and various configurations may be used as the configuration. For example, a plurality of modules may serve collectively as the supply control module.

In addition, the external device for transmitting a read request to the memory controller 200 or 200b is not limited to the CPU 700 or 700a, and an arbitrary device may be used. For example, a dedicated data processing circuit that performs a data process in a predetermined order may be used.

Modified Example 9

The memory module 100 or 100b of the above-described embodiments may be used for any arbitrary device. For example, the memory module may be used for a data processing apparatus that generates print data from image data input from a printer. In addition, the memory module may be used for a data processing device that generates display image data from data input from a projector. In addition, the memory module may be used for a data processing apparatus that generates image data of a digital camera. Furthermore, the memory module may be used for a general purpose computer.

Modified Example 10

In the above-described embodiments, a part of the configuration implemented by hardware may be substituted by software. On the contrary, a part of the configuration implemented by software may be substituted by hardware. For example, the function of the module controller 210 shown in FIG. 1 may be implemented by executing a program in a computer having a CPU and a memory.

When a part or the whole of the function of the present invention is implemented by software, the software (computer program) may be provided in a form of a computer readable recording medium in which the software is stored. In this invention, the computer readable recording medium is not limited to a portable recording medium such as a flexible disc or a CD-ROM and includes an internal memory device of a computer such as a RAM or a ROM and an external memory device such as a hard disk that is fixed to a computer.

The entire disclosure of Japanese Patent Application No. 2007-040788, filed Feb. 21, 2007 is expressly incorporated by reference herein.

What is claimed is:

1. A memory controller for controlling a memory that operates in synchronization with a clock signal,
   wherein the memory sequentially outputs data of addresses starting from a target address in synchronization with the clock signal after receiving a read command and the target address,
   the memory controller comprising a supply control module that performs a supply process for supplying data inside the memory corresponding to a request address to an external device, in response to a read request designating the request address which is transmitted from the external device,
   wherein the supply process includes a supply process using a sequential mode, and
   wherein the supply process using the sequential mode includes:
   a process for acquiring data to be supplied to the external device from the memory in response to read requests by repeatedly stopping and restarting supply of the clock signal without supplying the read command and the target address to the memory, in a case where a plurality of consecutive request addresses are sequentially designated one after another by a plurality of the consecutive read requests; and
   a process for supplying requested data from among data acquired in response to the plurality of the read requests to the external device.

2. The memory controller according to claim 1, further comprising a buffer for temporarily storing the data acquired from the memory,
   wherein the supply process using the sequential mode further includes:
   a process for acquiring data from the memory by restarting the supply of the clock signal and storing the acquired data in the buffer before the read request requesting for the acquired data is received; and
   a process for supplying the acquired data from the buffer to the external device in response to a read request requesting for the acquired data.

3. The memory controller according to claim 2, wherein the supply process using the sequential mode further includes:
   a process for acquiring data corresponding to predetermined N (where N is an integer equal to or larger than one) consecutive addresses starting from a request address designated by a first read request from the memory, storing the acquired data in the buffer, and stopping the supply of the clock signal in response to the first read request in the supply process using the sequential mode; and
   a process for restarting the supply of the clock signal in response to achievement of a predetermined condition including reception of predetermined M (M is an integer equal to or larger than one and equal to or smaller than N) read requests.

4. The memory controller according to claim 1,
   wherein the supply process further includes a supply process using a random mode, and
   wherein the supply process using the random mode includes:
   a process for supplying the read command to the memory and stopping the supply of the clock signal to the memory, before reception of a read request next to the read request after data requested by the received read request is acquired from the memory; and
   a process for restarting the supply of the clock signal, supplying a target address corresponding to a request address designated by the next read request, acquiring data requested by the next read request from the memory, and supplying the acquired data to the external device, in response to the reception of the next read request.

5. The memory controller according to claim 4,
   wherein the supply control module performs a process including a selection process using a first selection mode as a selection process for selecting a mode for performing the supply process between the sequential mode and the random mode, and
   wherein the selection process using the first selection mode includes:
   a process for selecting the sequential mode on the basis of reception of a direction for which the sequential mode is to be used from the external device; and
   a process for selecting the random mode on the basis of reception of a direction for which the random mode is to be used from the external device.

6. The memory controller according to claim 4,
   wherein the supply control module performs a process including a selection process using a second selection mode as a selection process as a selection process for selecting a mode for performing the supply process between the sequential mode and the random mode, and
   wherein the selection process using the second selection mode includes:
   a process for selecting the sequential mode in a case where the request address is within a predetermined range; and
   a process for selecting the random mode in a case where the request address is beyond the predetermined range.

7. The memory controller according to claim 4,
   wherein the external device includes a calculation unit,
   wherein the calculation unit includes:
   an execution module for executing a process in accordance with a program code; and
   a prefetch module for acquiring the program code from the memory through the memory controller before execution is performed by the execution module, and
   wherein the prefetch module includes a determination module that determines whether a prefetch address that is a request address corresponding to a program code to be newly acquired is to be set to an address next to the request address corresponding to a last acquired program code, wherein the supply control module performs a process including a selection process using a third selection mode as a selection process for selecting a mode for performing the supply process between the sequential mode and the random mode, and wherein the selection process using the third selection mode includes:

a process for acquiring a result of the determination from the determination module;

a process for selecting the sequential mode in a case where the result of the determination indicates that the prefetch address is set to be the next address; and a process for selecting the random mode in a case where the result of the determination indicates that the prefetch address is not set to be the next address.

8. The memory controller according to claim 4, wherein the memory performs a process from the start of one read command to the end of the read command while a given chip select signal is maintained to be in an active state, and wherein the supply process using the random mode further includes a process for maintaining the chip select signal to be in an active state from the start of supply of the read command to the memory before reception of the next read request to completion of acquisition of data requested by the next read request from the memory.

9. The memory controller according to claim 8, wherein the memory can receive a new read command in response to shift of the chip select signal from an inactive state to an active state, and wherein the supply process using the random mode further includes a process for setting the chip select signal to be in an inactive state before supply of the read command to the memory which is performed before reception of the next read request and continuously setting the chip select signal to be in an active state.

10. The memory controller according to claim 1, wherein the memory performs a process from the start of one read command to the end of the read command while a given chip select signal is maintained to be in an active state, and wherein the supply process using the sequential mode further includes a process that maintains the chip select signal to be in an active state while operations for stopping 4 and restarting of the supply of the clock signal are repeatedly performed.

11. The memory controller according to claim 1, wherein the supply process using the sequential mode further includes a process for performing a non-consecutive responding process in response to reception of a non-consecutive read request designating a non-consecutive request address, and wherein the non-consecutive responding process includes:

a process for acquiring non-consecutive address data that is data corresponding to the non-consecutive read request from the memory by supplying the clock signal, the read command, and a target address corresponding to a request address designated by the non-consecutive read request to the memory; and a process for supplying the acquired non-consecutive address data to the external device.

12. A memory module comprising:

the memory controller according to claim 1; and a memory.

13. A method of controlling a memory that operates in synchronization with a clock signal, wherein the memory sequentially outputs data of addresses starting from a target address in synchronization with the clock signal after receiving a read command and the target address, the method comprising performing a supply process for supplying data inside the memory corresponding to a request address to an external device, in response to a read request designating the request address which is transmitted from the external device, wherein the supply process includes a supply process using a sequential mode, and wherein the supply process using the sequential mode includes:

a process for acquiring data to be supplied to the external device from the memory in response to read requests by repeatedly stopping and restarting supply of the clock signal without supplying the read command and the target address to the memory, in a case where a plurality of consecutive request addresses are sequentially designated one after another by a plurality of the consecutive read requests; and a process for supplying requested data from among data acquired in response to the plurality of the read requests to the external device.

* * * * *